United States Patent
Jeon et al.

(10) Patent No.: US 12,022,490 B2
(45) Date of Patent: *Jun. 25, 2024

(54) CONFIGURED GRANT AND DYNAMIC GRANT TRANSMISSION

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US); Alireza Babaei, Fairfax, VA (US); Kyungmin Park, Vienna, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,439

(22) Filed: Apr. 19, 2023

(65) Prior Publication Data

US 2023/0328746 A1 Oct. 12, 2023

Related U.S. Application Data

(63) Continuation of application No. 17/545,061, filed on Dec. 8, 2021, now Pat. No. 11,671,988, which is a
(Continued)

(51) Int. Cl.
*H04W 72/23* (2023.01)
*H04L 1/08* (2006.01)
(Continued)

(52) U.S. Cl.
CPC .............. *H04W 72/23* (2023.01); *H04L 1/08* (2013.01); *H04L 1/1819* (2013.01);
(Continued)

(58) Field of Classification Search
CPC ............ H04W 72/23; H04W 72/0453; H04W 72/20; H04W 74/0833
See application file for complete search history.

(56) References Cited

U.S. PATENT DOCUMENTS

2009/0257408 A1  10/2009  Zhang et al.
2011/0003555 A1  1/2011  Guo
(Continued)

FOREIGN PATENT DOCUMENTS

WO   2017204595 A1   11/2017

OTHER PUBLICATIONS

Dec. 3, 2018—Extended European Search Report—EP 18188574.0.
(Continued)

*Primary Examiner* — Jackie Zuniga Abad
(74) *Attorney, Agent, or Firm* — Banner & Witcoff, Ltd.

(57) ABSTRACT

Systems, apparatuses, and methods are described for wireless communications. A base station may transmit parameters for a configured grant and a dynamic grant. The parameters may indicate numbers of transmissions of transport blocks within a bundle of a configured grant and within a bundle of a dynamic grant. A wireless device may transmit a first transport block, within a bundle of a configured grant, a first number of times. The wireless device may transmit a second transport block, within a bundle of a dynamic grant, a second number of times.

55 Claims, 21 Drawing Sheets

Related U.S. Application Data continuation of application No. 16/125,310, filed on Sep. 7, 2018, now Pat. No. 11,246,154.

(60) Provisional application No. 62/555,391, filed on Sep. 7, 2017.

(51) Int. Cl.
*H04L 1/1812* (2023.01)
*H04L 1/1829* (2023.01)
*H04L 1/1867* (2023.01)
*H04W 72/0453* (2023.01)
*H04W 72/20* (2023.01)
*H04W 74/0833* (2024.01)

(52) U.S. Cl.
CPC ............ *H04L 1/1864* (2013.01); *H04L 1/189* (2013.01); *H04W 72/0453* (2013.01); *H04W 72/20* (2023.01); *H04W 74/0833* (2013.01)

(56) References Cited

U.S. PATENT DOCUMENTS

| | | |
|---|---|---|
| 2011/0032895 A1 | 2/2011 | Englund et al. |
| 2013/0250924 A1 | 9/2013 | Chen et al. |
| 2013/0343273 A1 | 12/2013 | Barbieri et al. |
| 2014/0010105 A1 | 1/2014 | Sakabe |
| 2014/0098761 A1 | 4/2014 | Lee et al. |
| 2014/0362832 A1 | 12/2014 | Rudolf et al. |
| 2015/0016352 A1 | 1/2015 | Bressanelli et al. |
| 2015/0208386 A1 | 7/2015 | Yang et al. |
| 2015/0327107 A1 | 11/2015 | Kim et al. |
| 2015/0334769 A1 | 11/2015 | Kim et al. |
| 2016/0050658 A1 | 2/2016 | Tabet et al. |
| 2016/0150440 A1 | 5/2016 | Lee et al. |
| 2016/0278073 A1 | 9/2016 | Dinan |
| 2017/0331595 A1 | 11/2017 | Rudolf et al. |
| 2018/0070403 A1 | 3/2018 | Uemura et al. |
| 2018/0124648 A1 | 5/2018 | Park et al. |
| 2018/0139734 A1 | 5/2018 | Babaei et al. |
| 2018/0176937 A1 | 6/2018 | Chen et al. |
| 2018/0183551 A1 | 6/2018 | Chou et al. |
| 2019/0103951 A1* | 4/2019 | Park .................. H04W 72/0446 |
| 2019/0373585 A1 | 12/2019 | Suzuki et al. |

OTHER PUBLICATIONS

CATT—Jun. 26, 2017—"Grant-free UL Transmission procedure".
Nokia Siemens Networks Oct. 5, 2010 "MAC CE for Activation Deactivation".
Huawei Sep. 17, 2017 "UL data transmission with and without SR\UL grant".
CATT May 14, 2017 "Further details of UL grant-free transmission for URLLC".
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TSG RAN WG1 Meeting #90, Prague, Czech Republic, Aug. 21-25, 2017, Title: RAN1 Chairman's Notes.
3GPP TSG RAN WG1 Meeting NR#3, Nagoya, Japan, Sep. 18-21, 2017, Title: RAN1 Chairman's Notes.
3GPP TR 38.804 V14.1.0 (Mar. 2017), Technical Report, 3rd Generation Partnership Project, Technical Specification Group Radio Access Network, Study on New Radio Access Technology, Radio Interface Protocol Aspects (Release 14).
3GPP TSG RAN WG2 #99, Berlin, Germany, Aug. 21-25, 2017, Source: Vice-Chairwoman (InterDigital), Title: Report from LTE and NR User Plane Break-Out Session.
3GPP TSG-RAN WG2 NR Ad Hoc, Qingdao, China, Jun. 27-30, 2017, Source: RAN1 Chairman, Object: Chairman Notes.
R1-1706901 3GPP TSG-RAN WG1 #89, Hangzhou, China, May 15-19, 2017, Source: Huawei, HiSilicon, Title: TB mapping for slot aggregation.
R1-1706909 3GPP TSG-RAN WG1 #89, Hangzhou, China, May 15-19, 2017, Source: Huawei, HiSilicon, Title: On uplink data scheduling.
R1-1706914 3GPP TSG-RAN WG1 #89, Hangzhou, China, May 15-19, 2017, Source: Huawei, HiSilicon, Title: Numerology for multiplexing of eMBB and URLLC.
R1-1707166 3GPP TSG-RAN WG1 #89, Hangzhou, China, May 15-19, 2017, Source: ZTE, Title: HARQ for URLLC UL Grant-free transmission.
R1-1707176 3GPP TSG-RAN WG1 #89, Hangzhou, China, May 15-19, 2017, Source: ZTE, Title: Multiplexing data with different transmission durations.
R1-1707195 3GPP TSG-RAN WG1 #89, Hangzhou, China, May 15-19, 2017, Source: FiberHome, Title: Discussion on resource allocation for NR.
R1-1707237 3GPP TSG-RAN WG1 #89, Hangzhou, China, May 15-19, 2017, Source: vivo, Title: Discussion on flexible length scheduling.
R1-1707508 3GPP TSG-RAN WG1 #89, Hangzhou, China, May 15-19, 2017, Source: CATT, Title: NR DL scheduling mechanism.
R1-1707656 3GPP TSG-RAN WG1 #89, Hangzhou, China, May 15-19, 2017, Source: LG Electronics, Title: Consideration on HARQ-ACK feedback method for NR.
R1-1707662 3GPP TSG-RAN WG1 #89, Hangzhou, China, May 15-19, 2017, Source: LG Electronics, Title: Consideration on CB group based HARQ-ACK feedback.
R1-1708017 3GPP TSG-RAN WG1 #89, Hangzhou, China, May 15-19, 2017, Source: Samsung, Title: DL Resource Allocation Aspects.
R1-1709991 3GPP TSG-RAN WG1 NR Ad Hoc, Qingdao, China, Jun. 27-30, 2017, Source: Huawei, HiSilicon, Title: Resource configuration on UL transmission without grant.
R1-1710015 3GPP TSG-RAN WG1 NR Ad Hoc, Qingdao, China, Jun. 27-30, 2017, Source: ZTE, Title: Considerations on the procedures of UL data transmission without grant.
R1-1710094 3GPP TSG-RAN WG1 NR Ad Hoc, Qingdao, China, Jun. 27-30, 2017, Source: CATT, Title: Grant-free UL transmission procedure.
R1-1710327 3GPP TSG-RAN WG1 NR Ad Hoc, Qingdao, China, Jun. 27-30, 2017, Source: LG Electronics, Title: Discussion on UL transmission without grant.
R1-1710380 3GPP TSG-RAN WG1 NR Ad Hoc, Qingdao, China, Jun. 27-30, 2017, Source: vivo, Title: Discussion on UL grant-free transmission.
R1-1710568 3GPP TSG-RAN WG1 NR Ad Hoc, Qingdao, China, Jun. 27-30, 2017, Source: Intel Corporation, Title: UL grant-free transmissions: Resource configuration.
R1-1710621 3GPP TSG-RAN WG1 NR Ad Hoc, Qingdao, China, Jun. 27-30, 2017, Source: ETRI, Title: Resource allocation and transmission scheme for URLLC grant-free transmission.
R1-1710723 3GPP TSG-RAN WG1 NR Ad Hoc, Qingdao, China, Jun. 27-30, 2017, Source: Samsung, Title: Procedures for Grant-Free UL Transmissions.
R1-1710724 3GPP TSG-RAN WG1 NR Ad Hoc, Qingdao, China, Jun. 27-30, 2017, Source: Samsung, Title: Grant-free and grant-based UL transmissions.
R1-1710887 3GPP TSG-RAN WG1 NR Ad Hoc, Qingdao, China, Jun. 27-30, 2017, Source: Intel Corporation, Title: UL grant-free transmissions: Physical layer procedures.
R1-1710963 3GPP TSG-RAN WG1 NR Ad Hoc, Qingdao, China, Jun. 27-30, 2017, Source: NEC, Title: On network resources and UE transmission configurations for grant-free access.
R1-1710971 3GPP TSG-RAN WG1 NR Ad Hoc, Qingdao, China, Jun. 27-30, 2017, Source: China Telecom, Title: UL grant-free transmission for URLLC.

(56) References Cited

OTHER PUBLICATIONS

R1-1711006 3GPP TSG-RAN WG1 NR Ad Hoc, Qingdao, China, Jun. 27-30, 2017, Source: Institute for Information Industry (III), Title: Issues and Control Design for UL Grant-free URLLC.
R1-1711111 3GPP TSG-RAN WG1 NR Ad Hoc, Qingdao, China, Jun. 27-30, 2017, Source: NTT DOCOMO, Inc., Title: Overall solutions for UL grant free transmission.
R1-1711253 3GPP TSG-RAN WG1 NR Ad Hoc, Qingdao, China, Jun. 27-30, 2017, Source: NICT, Title: Resource configuration for UL transmission without grant.
R1-1711504 3GPP TSG-RAN WG1 NR Ad Hoc, Qingdao, China, Jun. 27-30, 2017, Source: Ericsson, Title: On SPS/Grant-Free Transmission.
R1-1712689 3GPP TSG RAN WG1 Meeting #90, Prague, Czech Republic, Aug. 21-25, 2017, Source: Lenovo, Motorola Mobility, Title: HARQ design for uplink grant-free transmission.
R1-1712743 3GPP TSG RAN WG1 Meeting #90, Prague, Czech Republic, Aug. 21-25, 2017, Source: Fujitsu, Title: Discussions on HARQ for grant-free transmission.
R1-1712823 3GPP TSG RAN WG1 Meeting #90, Prague, Czech Republic, Aug. 21-25, 2017, Source: Orange, China Unicom, Nokia, Nokia Shanghai Bell, Ericsson, ZTE, Apple, Title: WF on Scenario 1.
R1-1712863 3GPP TSG RAN WG1 Meeting #90, Prague, Czech Republic, Aug. 21-25, 2017, Source: vivo, Title: Discussion on UL grant-free transmission.
R1-1713189 3GPP TSG RAN WG1 Meeting #90, Prague, Czech Republic, Aug. 21-25, 2017, Source: LG Electronics, Title: Discussion on UL transmission without grant.
R1-1713639 3GPP TSG RAN WG1 Meeting #90, Prague, Czech Republic, Aug. 21-25, 2017, Source: Samsung, Title: Procedures for Grant-Free UL Transmissions.
R1-1714011 3GPP TSG RAN WG1 Meeting #90, Prague, Czech Republic, Aug. 21-25, 2017, Source: Nokia, Nokia Shanghai Bell, Title: UL transmission procedure without grant.
R1-1715419 3GPP TSG RAN WG1 Meeting NR Ad Hoc, Nagoya, Japan, Sep. 18-21, 2017, Source: Huawei, HiSilicon, Title: UL data transmission with and without SR/UL grant.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715490 3GPP TSG RAN WG1 Meeting NR Ad Hoc, Nagoya, Japan, Sep. 18-21, 2017, Source: Fujitsu, Title: Discussions on HARQ for UL data transmission without grant.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715548 3GPP TSG RAN WG1 Meeting NR Ad Hoc, Nagoya, Japan, Sep. 18-21, 2017, Source: Nokia, Nokia Shanghai Bell, Title: Remaining issues on UL transmission without grant.
R1-1715562 3GPP TSG RAN WG1 Meeting NR Ad Hoc, Nagoya, Japan, Sep. 18-21, 2017, Source: ZTE, Sanechips, Title: Further discussion on UL transmission without grant.
R1-1715645 3GPP TSG RAN WG1 Meeting NR Ad Hoc, Nagoya, Japan, Sep. 18-21, 2017, Source: vivo, Title: Support of UL data transmission without grant.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715662 3GPP TSG RAN WG1 Meeting NR Ad Hoc, Nagoya, Japan, Sep. 18-21, 2017, Source: NEC, Title: Remaining issues on UL transmission without grant.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715769 3GPP TSG RAN WG1 Meeting NR Ad Hoc, Nagoya, Japan, Sep. 18-21, 2017, Source: ETRI, Title: DL HARQ-ACK for GF PUSCH transmission.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715888 3GPP TSG RAN WG1 Meeting NR Ad Hoc, Nagoya, Japan, Sep. 18-21, 2017, Source: LG Electronics, Title: Discussion on UL data transmission procedure.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716107 3GPP TSG RAN WG1 Meeting NR Ad Hoc, Nagoya, Japan, Sep. 18-21, 2017, Source: NTT DOCOMO, Inc., Title: UL data transmission without UL grant.
R1-1716109 3GPP TSG RAN WG1 Meeting NR Ad Hoc, Nagoya, Japan, Sep. 18-21, 2017, Source: NTT DOCOMO,Inc., Title: Remaining issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716483 3GPP TSG RAN WG1 Meeting NR Ad Hoc, Nagoya, Japan, Sep. 18-21, 2017, Source: InterDigital, Inc., Title: On remaining details of UL data transmission without grant.
R1-1716597 3GPP TSG RAN WG1 Meeting NR Ad Hoc, Nagoya, Japan, Sep. 18-21, 2017, Source: Ericsson, Title: On UL Data Transmission Procedure.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716623 3GPP TSG RAN WG1 Meeting NR Ad Hoc, Nagoya, Japan, Sep. 18-21, 2017, Source: MediaTek Inc., Title: On UL data transmission without grant design and configuration.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.

(56) References Cited

OTHER PUBLICATIONS

R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT DOCOMO, Inc., Title: Remaining issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-171xxxx 3GPP TSG-RAN WG1 NR Ad Hoc, Qingdao, China, Jun. 27-30, 2017, Source: LG Electronics, Title: [draft] Summary of [89-22] Email discussion about UL data transmission without UL grant.
R1-17xxxxx 3GPP TSG RAN WG1 Meeting #90, Prague, Czech Republic, Aug. 21-25, 2017, Source: NTT DOCOMO, Inc., Title: Offline discussions on some topics for AI 6.1.3.1.
R2-1703453 3GPP TSG-RAN WG2 #97bis, Spokane, USA, Apr. 3-7, 2017, Source: Samsung, Title: HARQ for Numerology Multiplexing.
R2-1704479 3GPP TSG-RAN WG1 #98, Hangzhou, China, May 15-19, 2017, Source: Samsung, Title: The number of TBs per UL HARQ process.
R2-1704505 3GPP TSG-RAN WG1 #98, Hangzhou, China, May 15-19, 2017, Source: Samsung, Title: HARQ for numerology multiplexing.
R2-1704684 3GPP TSG-RAN WG1 #98, Hangzhou, China, May 15-19, 2017, Source: Ericsson, Title: Enhanced HARQ feedback mode in SPS.
R2-1706417 3GPP TSG-RAN WG2 NR Ad Hoc, Qingdao, China, Jun. 27-29, 2017, Source: CATT, Title: Grant-free transmission and SPS.
R2-1706448 3GPP TSG-RAN WG2 NR Ad Hoc, Qingdao, China, Jun. 27-29, 2017, Source: Spreadtrum Communications, Title: Discussion on UL grant-free transmission.
R2-1706589 3GPP TSG-RAN WG2 NR Ad Hoc, Qingdao, China, Jun. 27-29, 2017, Source: Nokia, Alcatel-Lucent Shanghai Bell, Title: Unified SPS and Grant-free operation.
R2-1706645 3GPP TSG-RAN WG2 NR Ad Hoc, Qingdao, China, Jun. 27-29, 2017, Source: ZTE, Title: Consideration on the multiple SPS and grant free.
R2-1706687 3GPP TSG-RAN WG2 NR Ad Hoc, Qingdao, China, Jun. 27-29, 2017, Source: InterDigital, Title: SPS and Grant-free operation for NR.
R2-1707098 3GPP TSG-RAN WG2 NR Ad Hoc, Qingdao, China, Jun. 27-29, 2017, Source: Samsung, Title: Uplink SPS and Grant-free Transmission Aspects.
R2-1707174 3GPP TSG-RAN WG2 NR Ad Hoc, Qingdao, China, Jun. 27-29, 2017, Source: Ericsson, Title: Grant Free and Semi-Persistent Scheduling in NR.
R2-1707247 3GPP TSG-RAN WG2 NR Ad Hoc, Qingdao, China, Jun. 27-29, 2017, Source: Huawei, HiSilicon, Title: Modelling of Grant free and SPS.
R2-1707268 3GPP TSG-RAN WG2 NR Ad Hoc, Qingdao, China, Jun. 27-29, 2017, Source: MediaTek Inc., Title: Comparison of SPS and grant-free schemes.
R2-1707500 3GPP TSG-RAN WG2 NR Ad Hoc, Qingdao, China, Jun. 27-29, 2017, Source: Vice-Chairwoman (InterDigital), Title: Report from NR User Plane Break-Out Session.
R2-1708732 3GPP TSG RAN WG2 #99, Berlin, Germany, Aug. 21-25, 2017, Source: InterDigital, Title: SPS and grant free operation.
R2-1708956 3GPP TSG RAN WG2 #99, Berlin, Germany, Aug. 21-25, 2017, Source: Huawei, HiSilicon, Title: Considerations on SPS and TTI-bundling in EN-DC.
R2-1709125 3GPP TSG RAN WG2 #99, Berlin, Germany, Aug. 21-25, 2017, Source: Qualcomm, Title: On reliable transmission of URLLC data.
R2-1709264 3GPP TSG RAN WG2 #99, Berlin, Germany, Aug. 21-25, 2017, Source: Huawei, HiSilicon, Title: Discussion on type 1 grant-free for connected mode UE.
R2-1710134 3GPP TSG RAN WG2 Meeting #99bis, Prague, Czech Republic, Oct. 9-13, 2017, Source: OPPO, Title: SPS operations for BWP switching.
R2-1710662 3GPP TSG RAN WG2 Meeting #99bis, Prague, Czech Republic, Oct. 9-13, 2017, Source: InterDigital, Inc., Title: SPS and grant free operation.
R2-1710958 3GPP TSG RAN WG2 Meeting #99bis, Prague, Czech Republic, Oct. 9-13, 2017, Source: vivo, Title: Duplication deactivation due to Scell or BWP deactivation.
R2-1711441 3GPP TSG RAN WG2 Meeting #99bis, Prague, Czech Republic, Oct. 9-13, 2017, Source: Huawei, HiSilicon, Title: MAC impact of bandwidth part activation/deactivation.
R2-1711613 3GPP TSG RAN WG2 Meeting #99bis, Prague, Czech Republic, Oct. 9-13, 2017, Source: LG Electronics, Title: PHR for wider bandwidth operation.
R2-1711643 3GPP TSG RAN WG2 Meeting #99bis, Prague, Czech Republic, Oct. 9-13, 2017, Source: Intel Corporation, Title: Activation of SCell containing BWPs.
R2-1711856 3GPP TSG RAN WG2 Meeting #99bis, Prague, Czech Republic, Oct. 9-13, 2017, Source: RAN2, Title: LS to RAN1 on SPS and Grant-free.
R2-1711904 3GPP TSG RAN WG2 Meeting #99bis, Prague, Czech Republic, Oct. 9-13, 2017, Source: Qualcomm Incorporated, Title: UE Power Saving during Active State.
R2-1711993 3GPP TSG RAN WG2 Meeting #99bis, Prague, Czech Republic, Oct. 9-13, 2017, Source: RAN2, Title: LS to RAN1 on SPS and Grant-free.

* cited by examiner

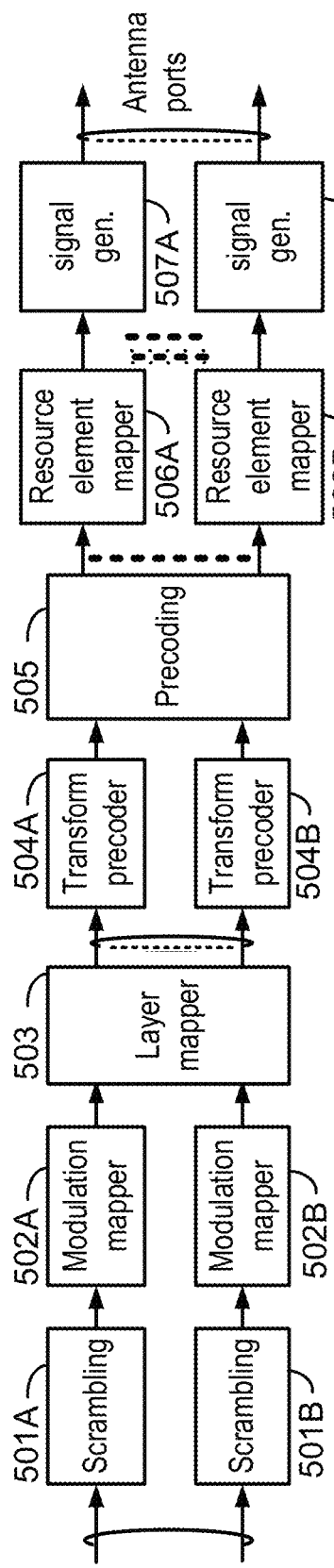
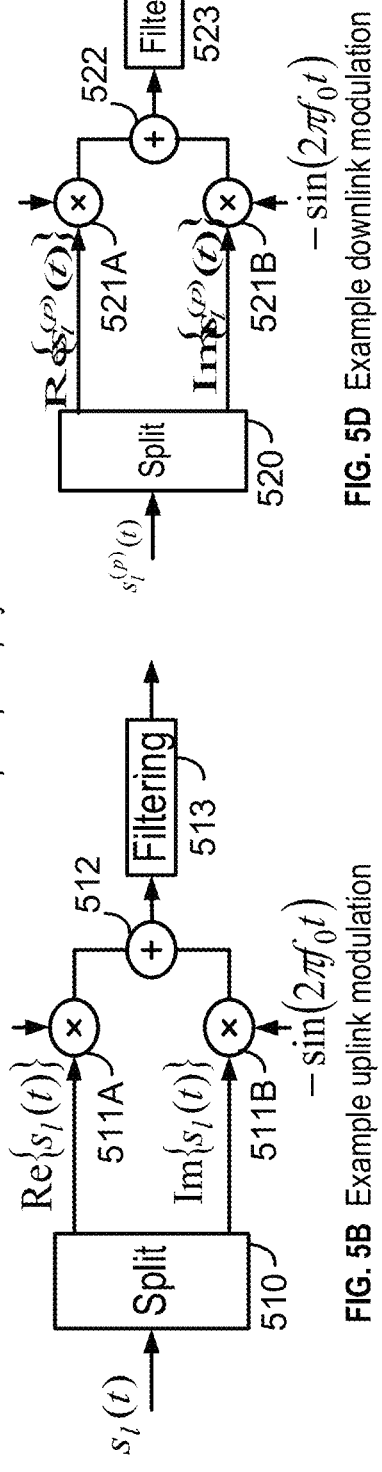
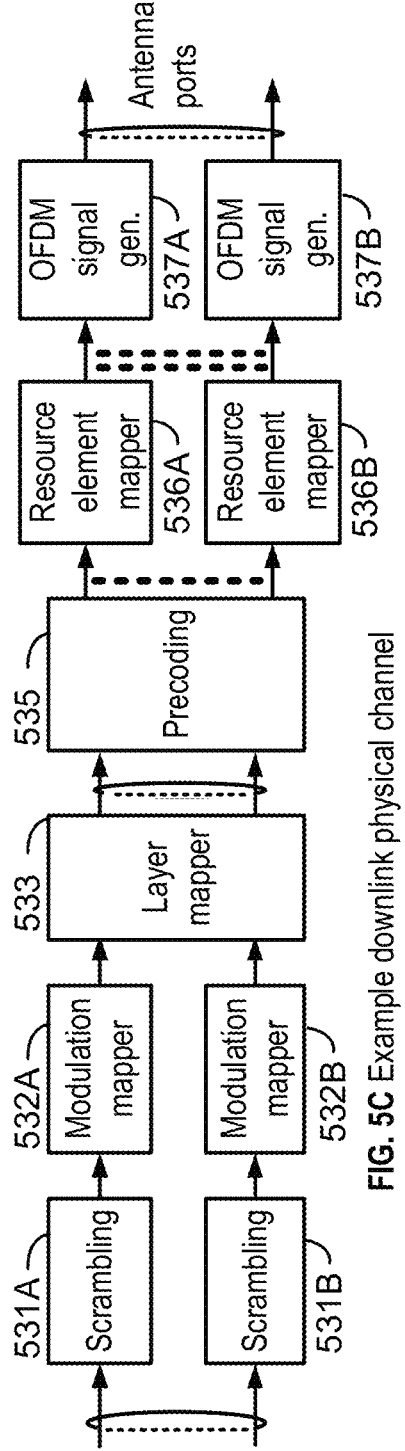
FIG. 5A Example uplink physical channel
FIG. 5B Example uplink modulation
FIG. 5C Example downlink physical channel
FIG. 5D Example downlink modulation

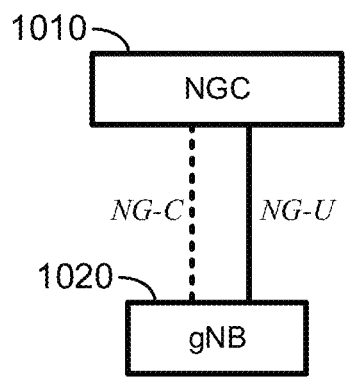
FIG. 10A gNB connected to NGC
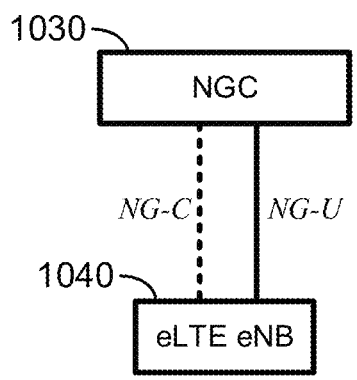
FIG. 10B eLTE eNB connected to NGC

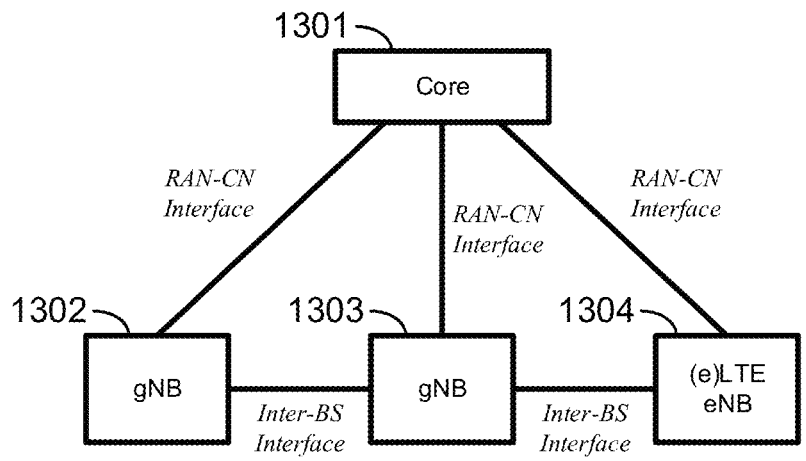
FIG. 13A Non-centralized deployment
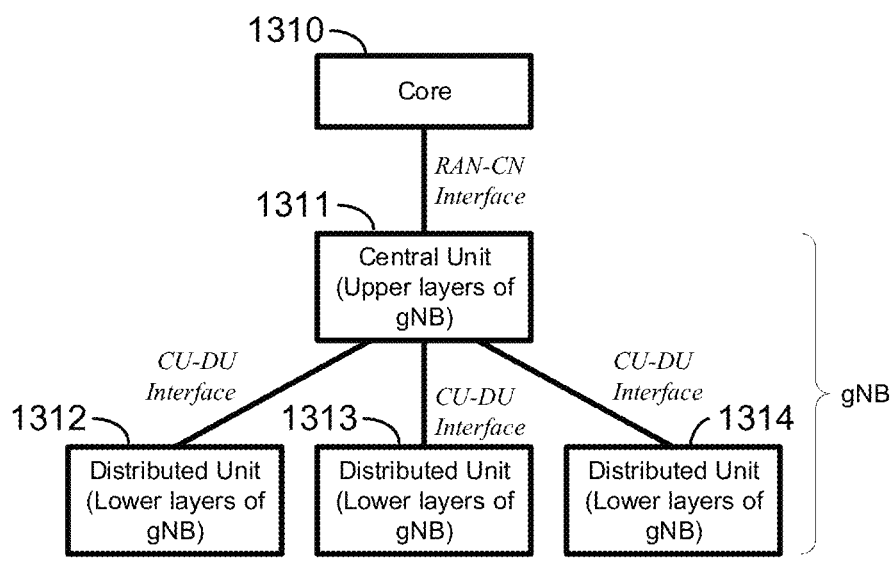
FIG. 13B Centralized deployment

CONFIGURED GRANT AND DYNAMIC GRANT TRANSMISSION

CROSS-REFERENCE TO RELATED APPLICATIONS

This application is a continuation of and claims priority to U.S. patent application Ser. No. 17/545,061, filed Dec. 8, 2021, which is a continuation of U.S. patent application Ser. No. 16/125,310, filed Sep. 7, 2018 (now U.S. Pat. No. 11,246,154), which claims the benefit of U.S. Provisional Application No. 62/555,391, filed on Sep. 7, 2017, each of which is hereby incorporated by reference in its entirety.

BACKGROUND

In wireless communications, uplink transmissions may comprise configured grant transmissions and dynamic grant transmissions. A wireless device may be required to retransmit transport blocks to ensure that the transport blocks are received by a base station. Difficulties may arise in retransmitting transport blocks for both configured grant transmissions and dynamic grant transmissions in a timely and efficient manner.

SUMMARY

The following summary presents a simplified summary of certain features. The summary is not an extensive overview and is not intended to identify key or critical elements.

Systems, apparatuses, and methods are described for communications. A base station may determine different numbers of retransmissions for configured grants and dynamic grants. Configured grants may be used for services that may require high reliability and/or lower latency (e.g., ultra-reliable low-latency communications (URLLC) services). Configured grants may require a number of retransmissions by a wireless device that may differ relative to a number of dynamic grant retransmissions, to provide sufficient reliability, latency, and/or efficiency. The base station may transmit, to a wireless device, parameters for a configured grant and a dynamic grant. The parameters may indicate a number of transmissions of transport blocks within a bundle of a configured grant and a number of transmissions of transport blocks within a bundle of a dynamic grant. The wireless device may determine a number of transmissions of transport blocks within a grant based on the type of grant. Based on the parameters, a wireless device may transmit a first transport block, within a bundle of a configured grant, a first number of times. Based on the parameters, the wireless device may transmit a second transport block, within a bundle of a dynamic grant, a second number of times. The first number may be different from the second number of times, such that a number of retransmissions of transport blocks within a bundle of a configured grant may differ from a number of retransmissions of transport blocks within a bundle of a dynamic grant. By configuring different numbers of retransmissions for configured grants and dynamic grants, reliability and/or latency may be improved.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 13A and FIG. 13B show examples for gNodeB (gNB) deployment.

DETAILED DESCRIPTION

Figure 1:
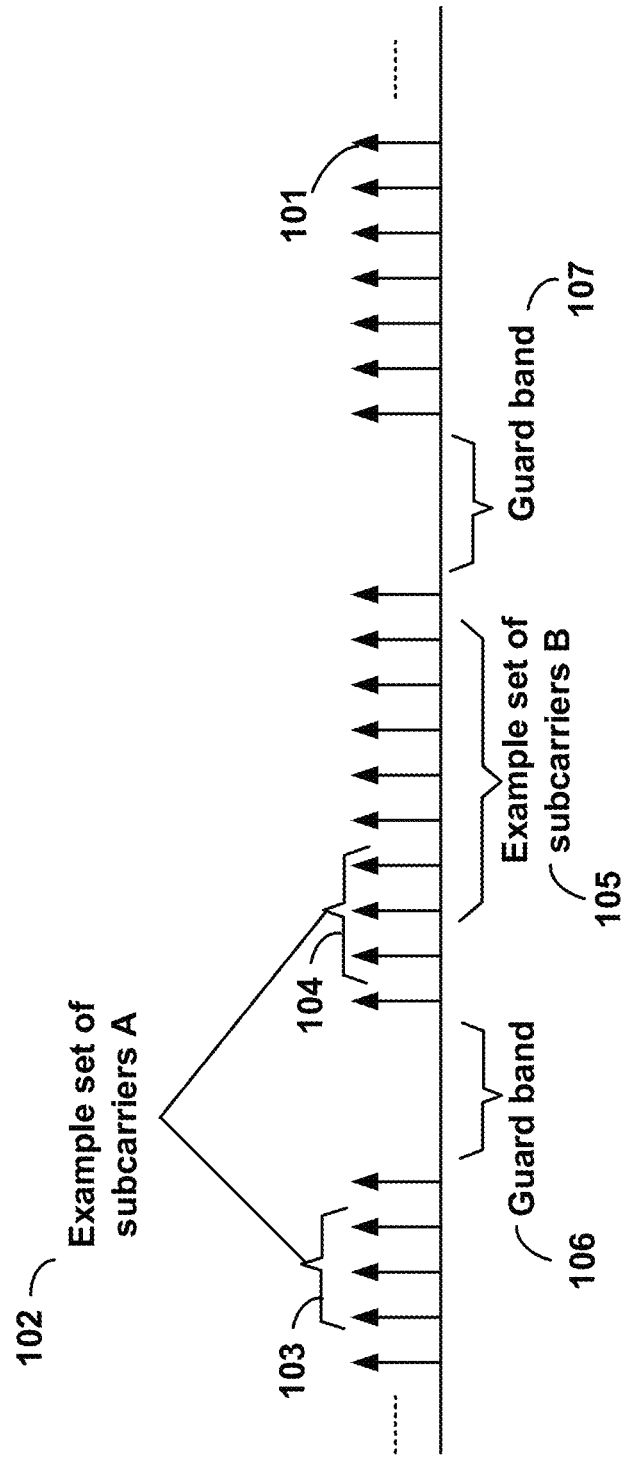
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to using different number of retransmissions for different types of uplink transmissions in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
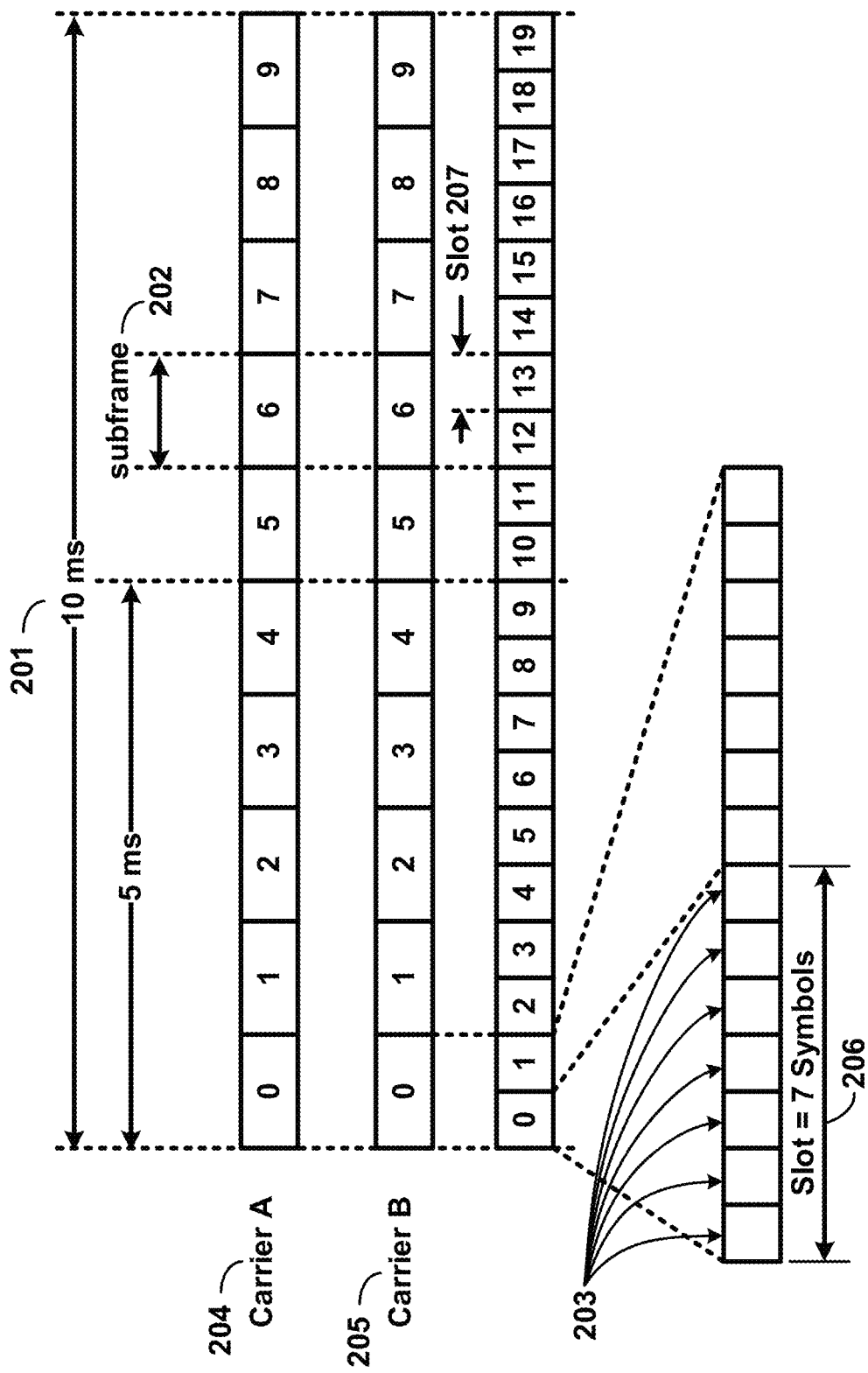
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
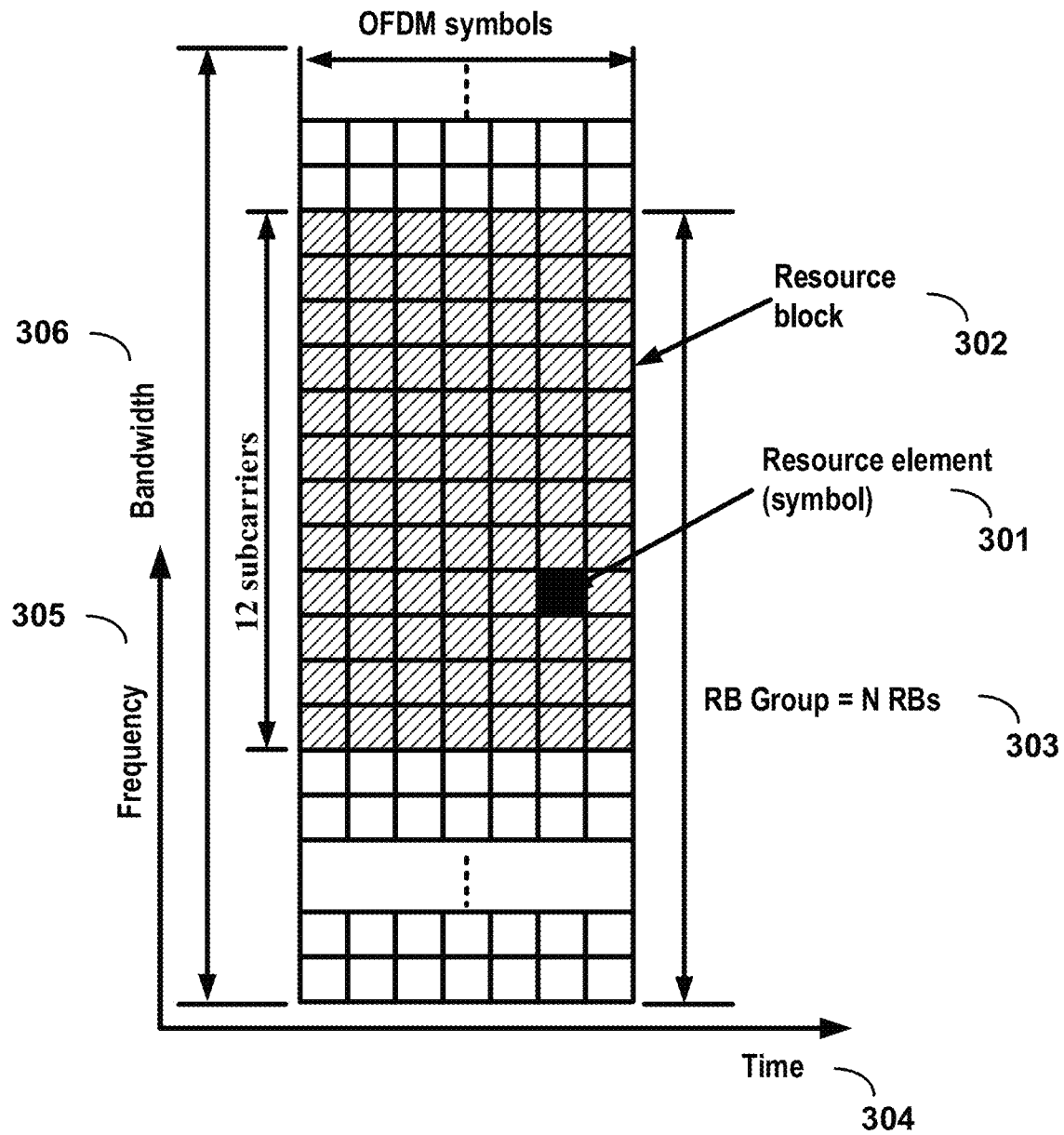
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
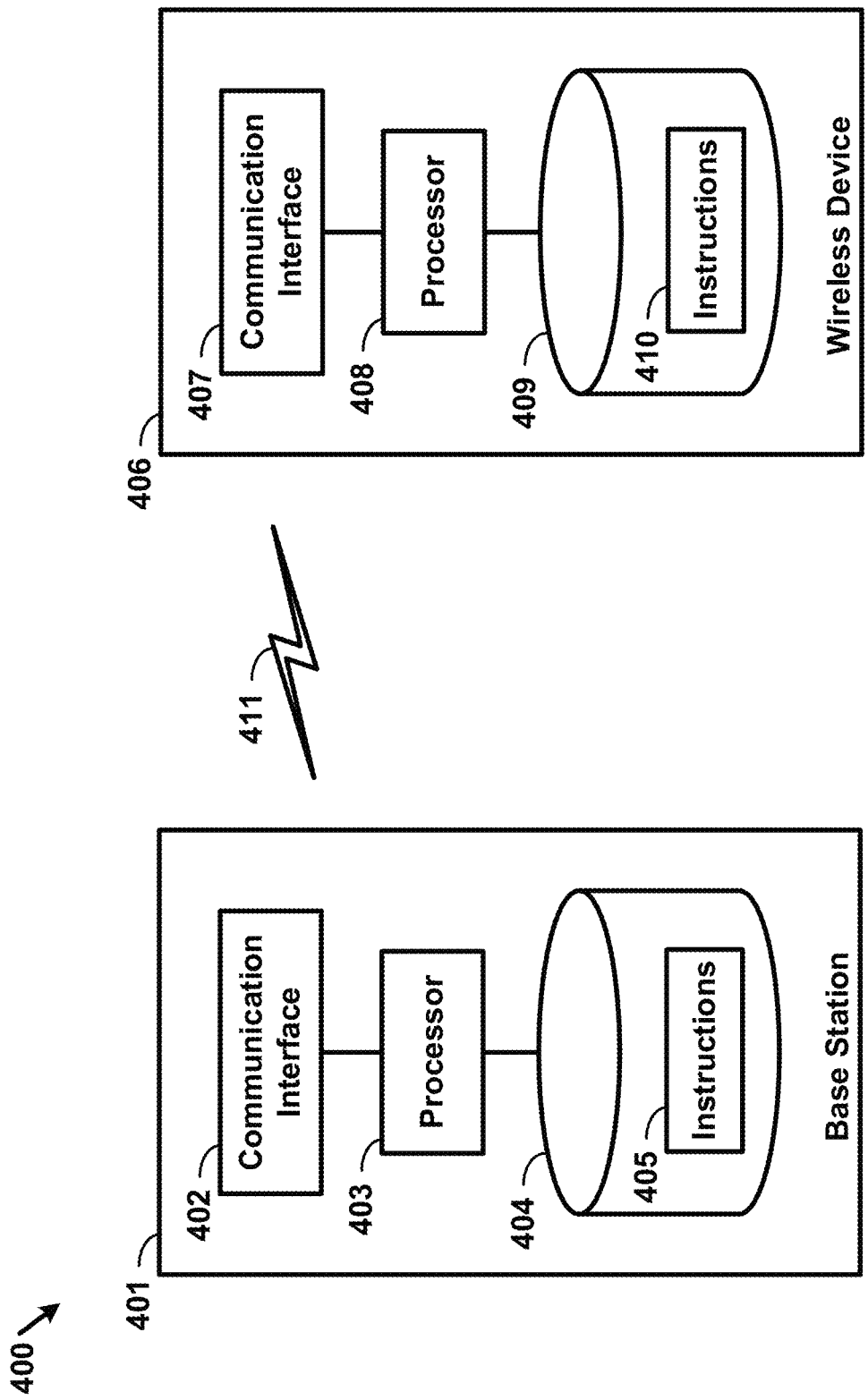
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-NACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multihomed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability (ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification, and/or release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 535 configured to perform precoding of the complex-valued modulation symbols on each layer for transmission on the antenna ports; one or more resource element mappers 536A and 536B configured to perform mapping of complex-valued modulation symbols for each antenna port to resource elements; one or more OFDM signal generators 537A and 537B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
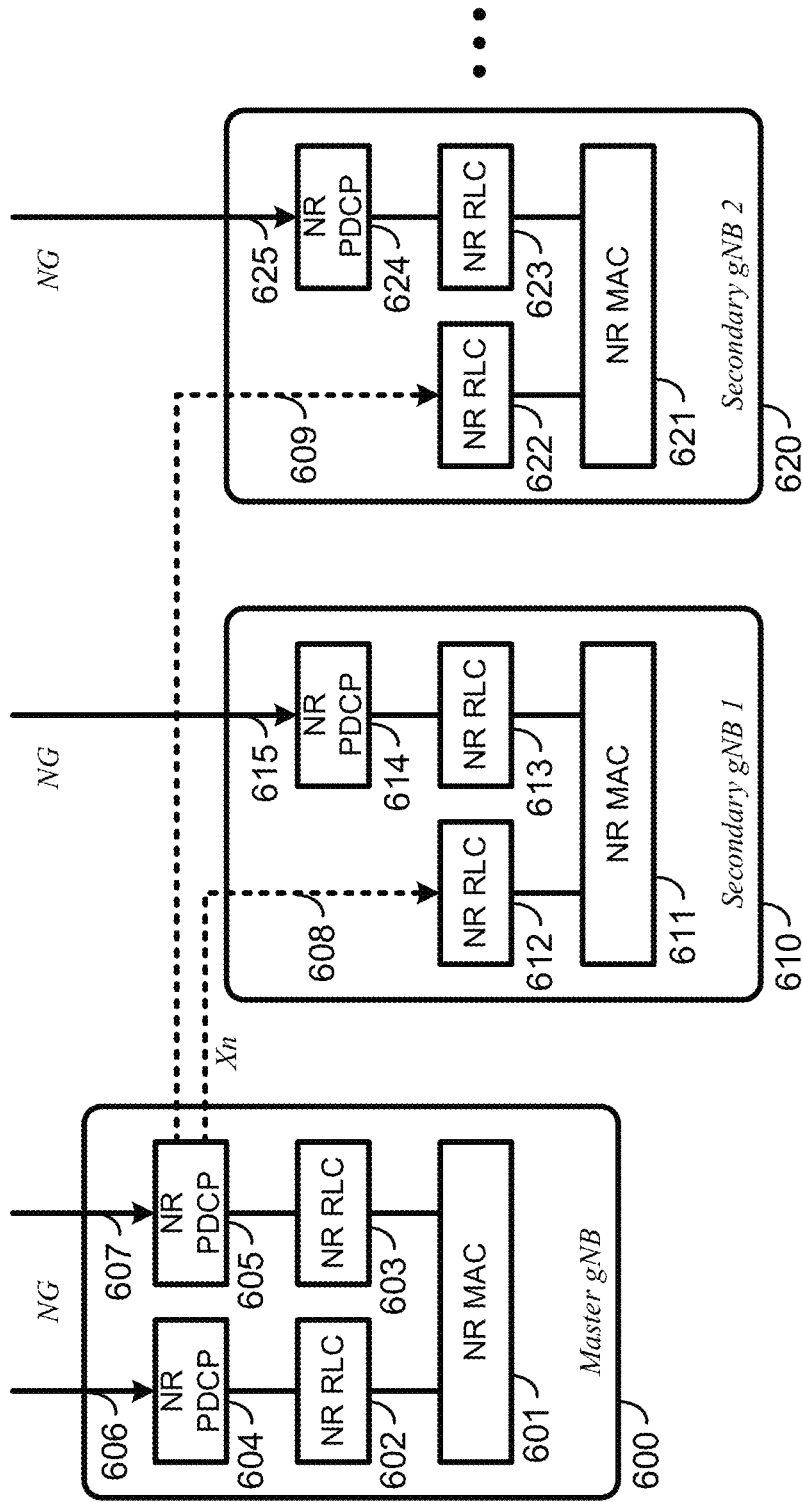
FIG. 6 shows an example protocol structure with multi-connectivity.
Figure 7:
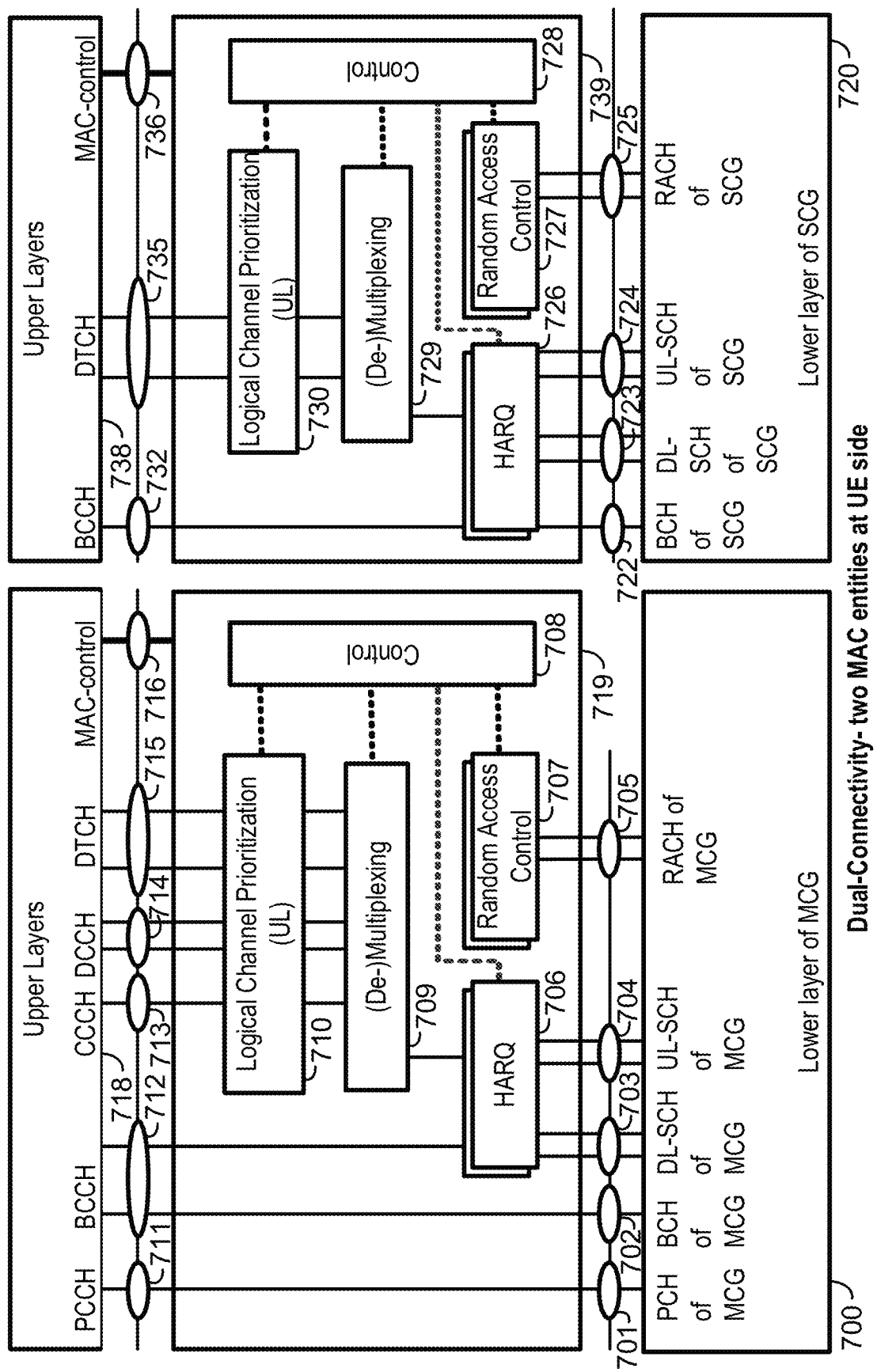
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 620 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
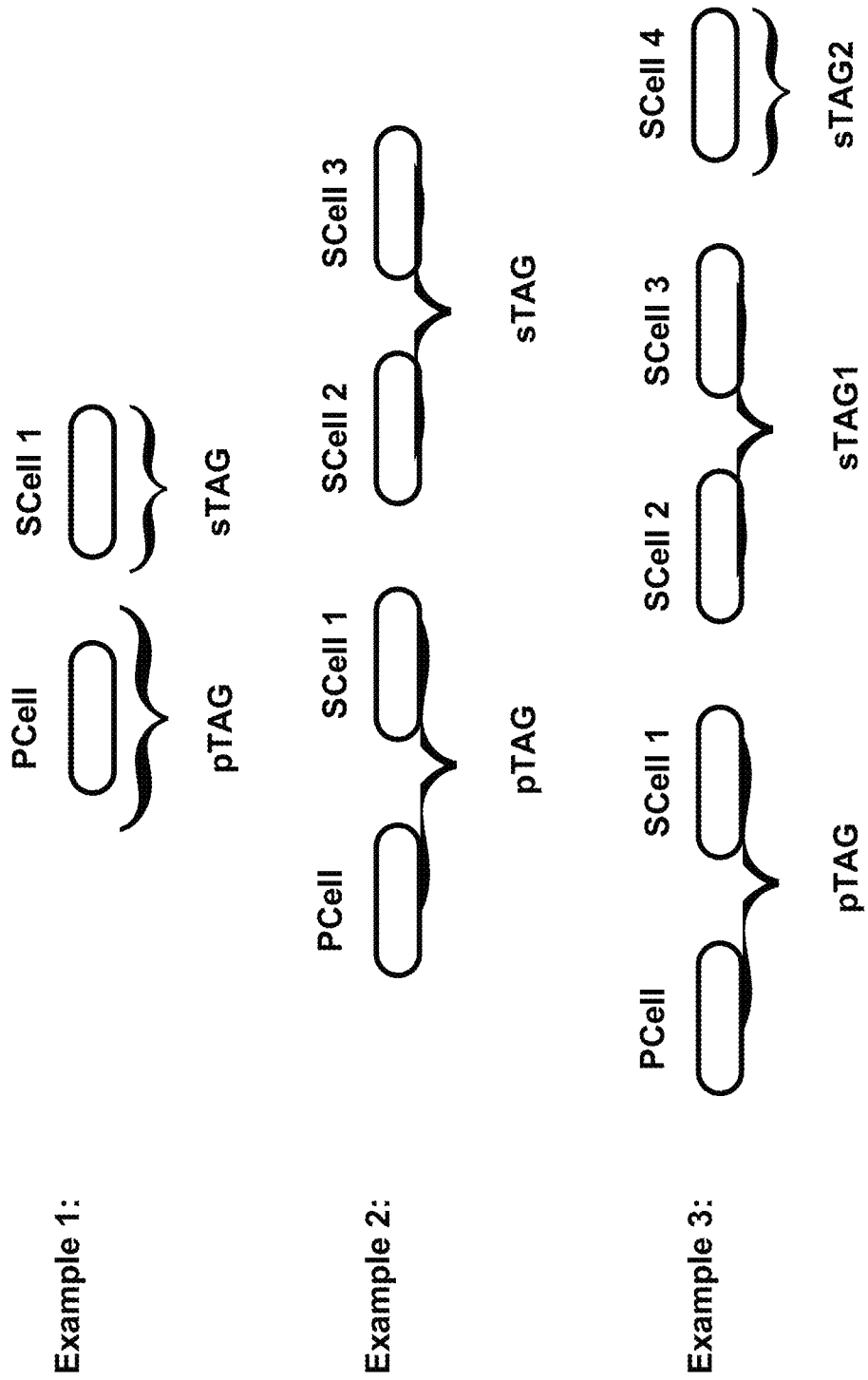
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
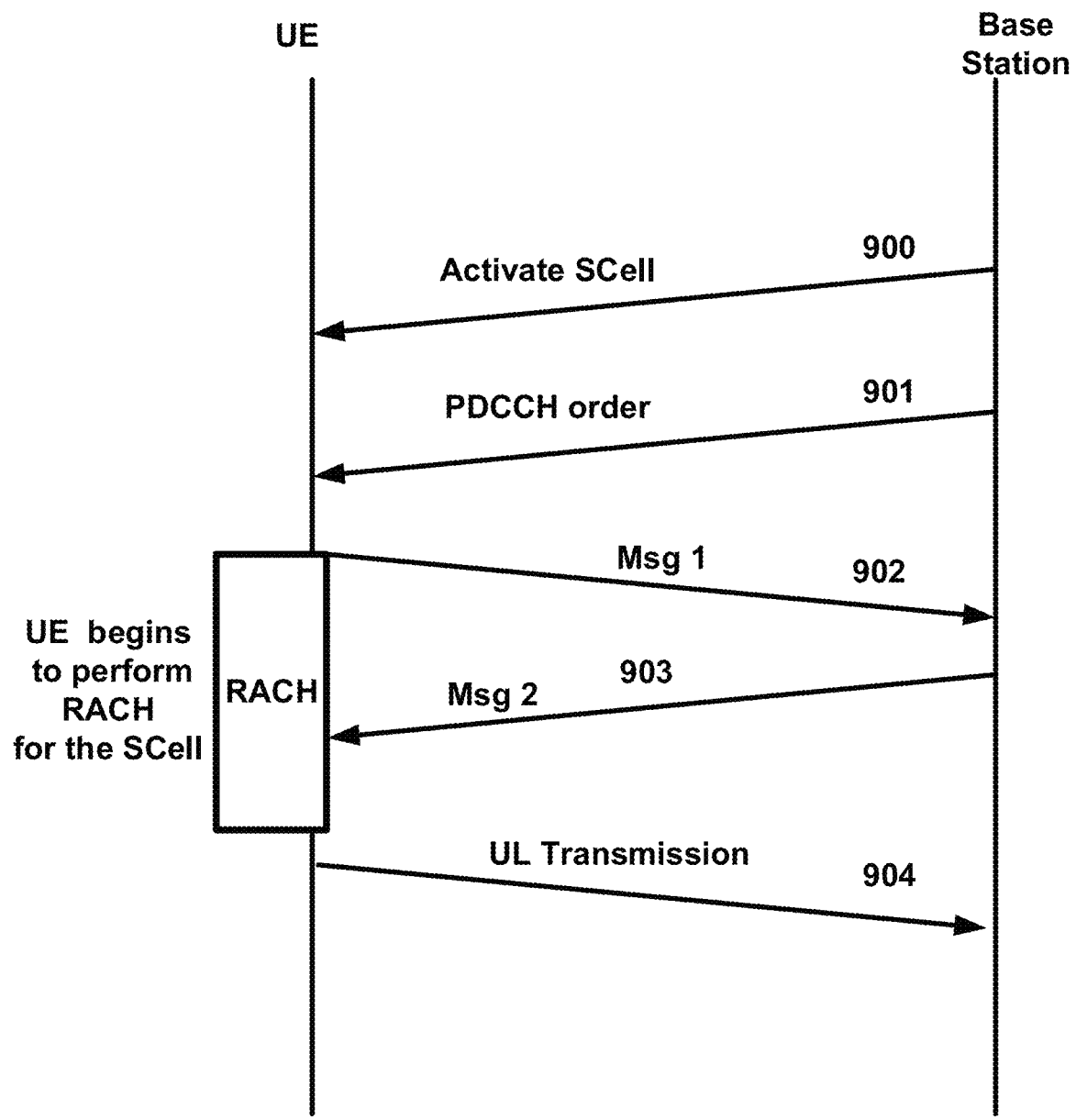
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDCCH order 901 to the wireless device, which may be transmitted, for example, after the activation command 900. The wireless device may begin to perform a RACH process for the SCell, which may be initiated, for example, after receiving the PDCCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command $N_{TA}$ (amount of timing advance) within a random access response window. The start of the random access preamble may be aligned with the start of a corresponding uplink subframe at the wireless device assuming $N_{TA}=0$. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

Figure 11A:
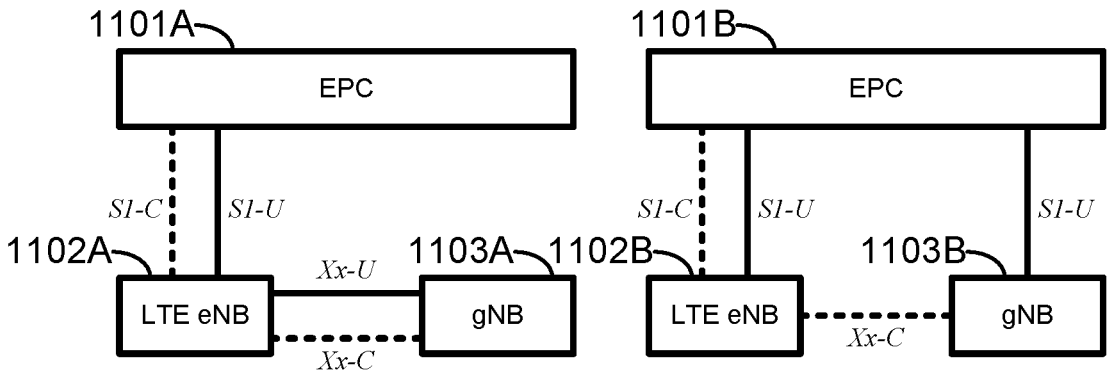
FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).
Figure 11B:
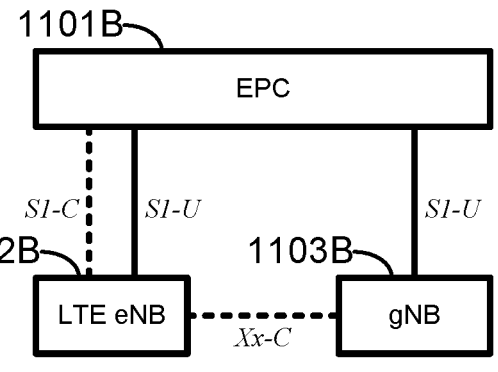
Figure 11C:
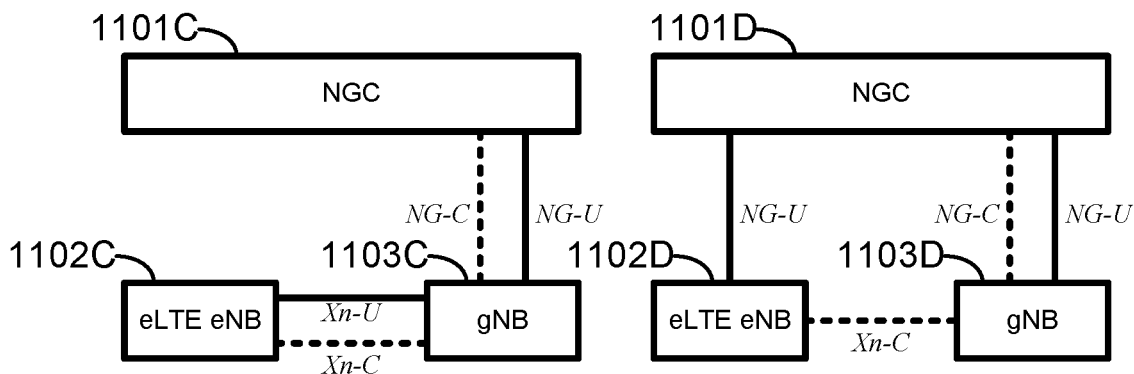
Figure 11D:
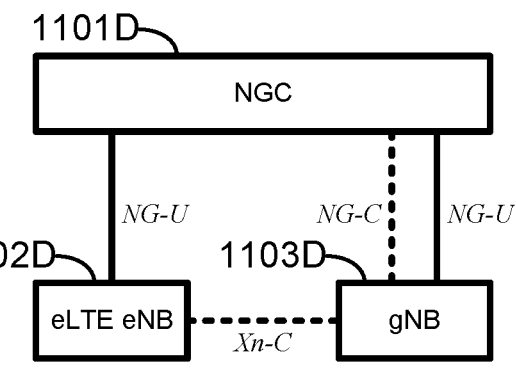
Figure 11E:
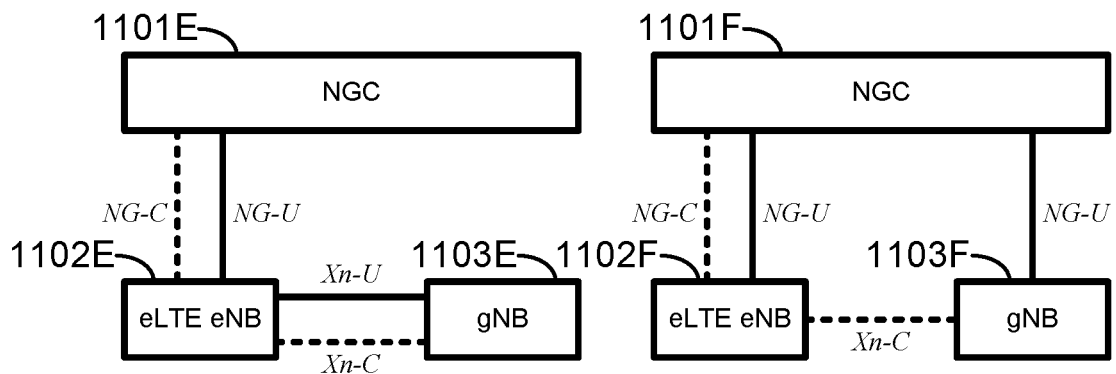
Figure 11F:
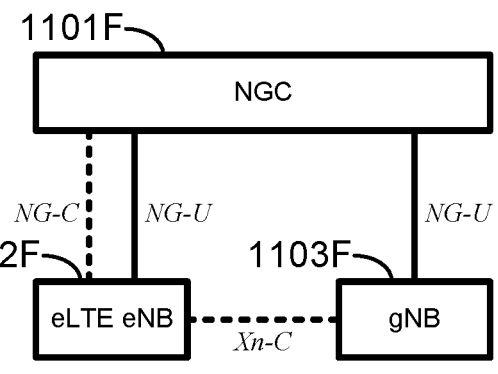

FIG. 11A, FIG. 11B, FIG. 11C, FIG. 11D, FIG. 11E, and FIG. 11F are examples for architectures of tight interworking between a 5G RAN and an LTE RAN. FIG. 11A shows an example of an LTE eNB connected to EPC with a non-standalone gNB. The gNG user plane may be connected to the EPC via LTE eNB. FIG. 11B shows an example of an LTE eNB connected to EPC with a non-standalone gNB. The gNG user plane may be connected to the EPC directly. FIG. 11C shows an example of an gNB connected to NGC with a non-standalone eLTE eNB. The eLTE eNB user plane may be connected to the NGC via gNB. FIG. 11D shows an example of an gNB connected to NGC with a non-standalone eLTE eNB. The eLTE eNB user plane may be connected to the NGC directly. FIG. 11E shows an example of an eLTE eNB connected to NGC with a non-standalone gNB. The gNB user plane may be connected to the NGC via eLTE eNB. FIG. 11F shows an example of an eLTE eNB connected to NGC with a non-standalone gNB. The gNB user plane may be connected to the NGC directly. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

Figure 12A:
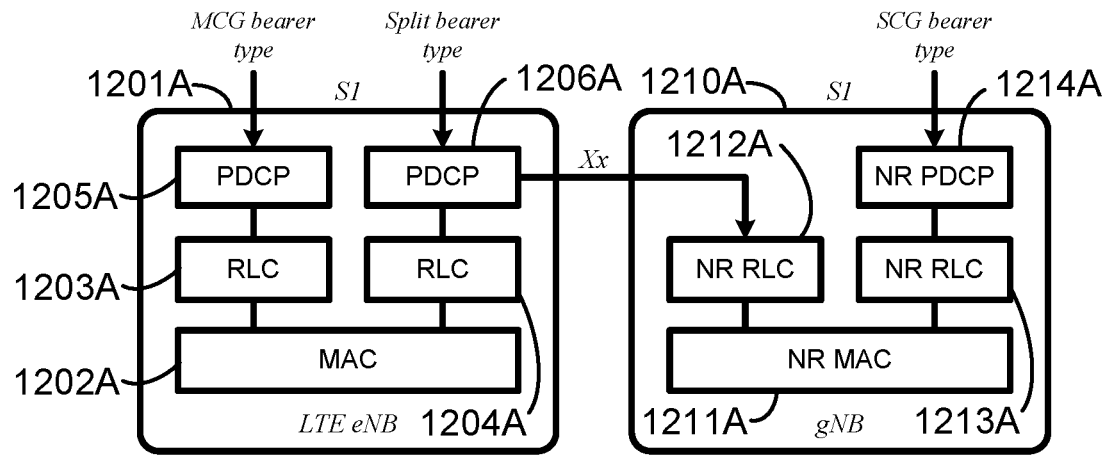
FIG. 12A, FIG. 12B, and FIG. 12C show examples for radio protocol structures of tight interworking bearers.
Figure 12B:
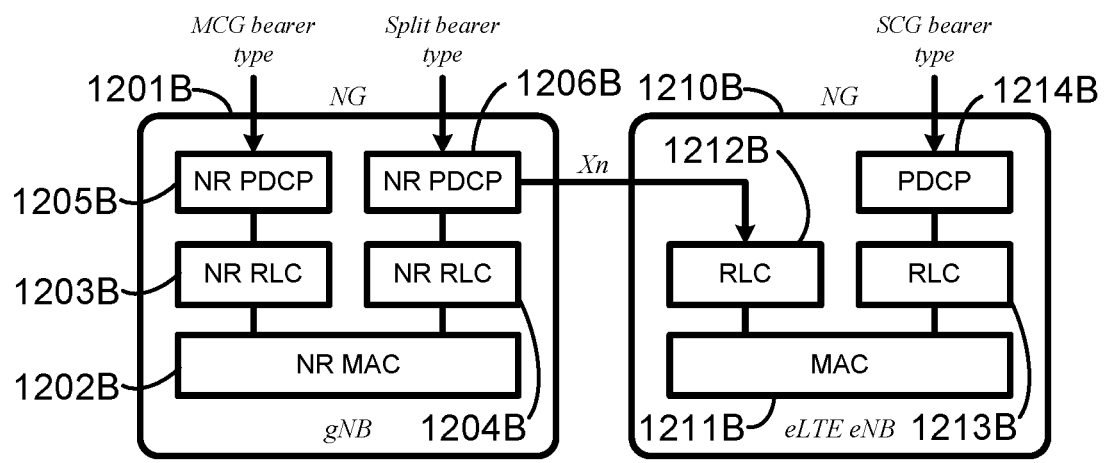
Figure 12C:
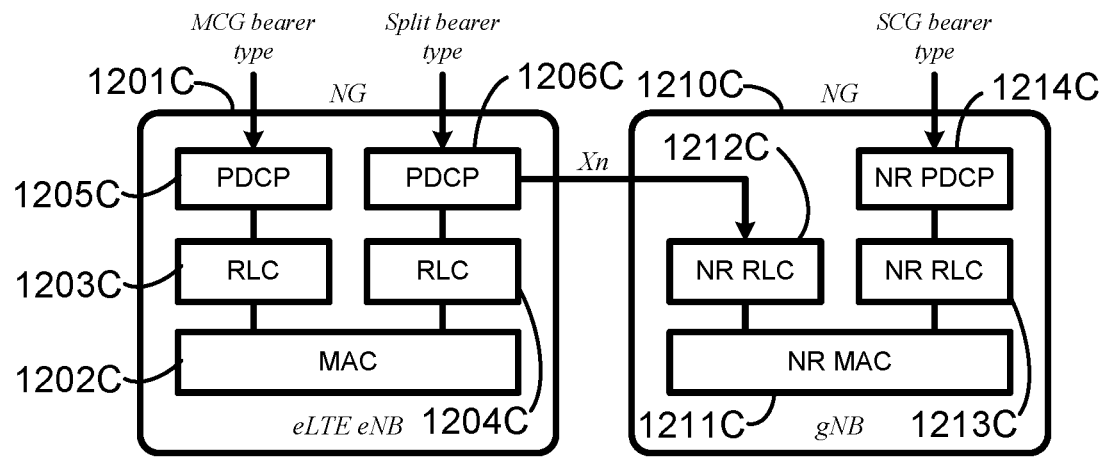

FIG. 12A, FIG. 12B, and FIG. 12C are examples for radio protocol structures of tight interworking bearers. FIG. 12A shows an example of a radio protocol architecture for split bearer and SCG bearer. The LTE eNG may be connected to EPC with a non-standalone gNB. FIG. 12B shows an example of a radio protocol architecture for split bearer and SCG bearer. The gNB may be connected to the NGC with a non-standalone eLTE eNB. FIG. 12C shows an example of a radio protocol architecture for split bearer and SCG bearer. The eLTE eNB may be connected to NGC with a non-standalone gNB.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1313, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
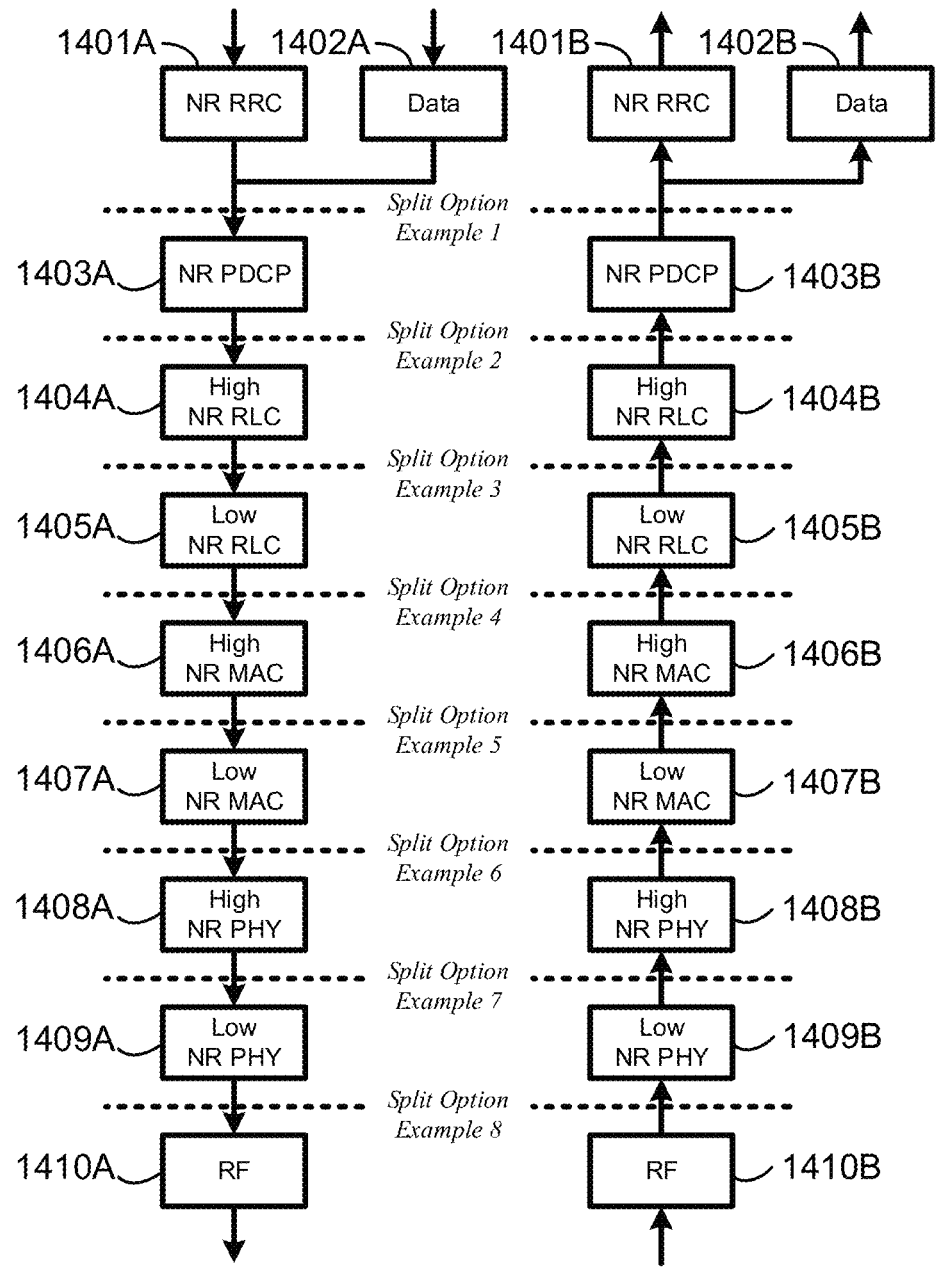
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementations, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A New Radio (NR) may support diverse uses and applications that may continue beyond the 3G and 4G standards, such as for enhanced Mobile Broadband (eMBB), Ultra Reliable Low Latency Communication (URLLC), massive Machine Type Communication (mMTC), and any other application or service.

Requirements for URLLC may be different from requirements for eMBB or mMTC. URLLC may have stringent requirements on latency and reliability. URLLC traffic may be sporadic and/or periodic. URLLC traffic may include, for example, vehicular communications that may enable autonomous driving and/or control networks for industrial applications. Packet sizes of URLLC traffic may depend upon time and may vary in different transmissions. A wireless device may not successfully complete an uplink (UL) transmission using resources allocated by a base station (e.g., a gNB in NR).

Different requirements for URLLC traffic may result in different treatment of URLLC traffic. Varying packet sizes of URLLC traffic may require a flexible radio resource allocation that may reflect a change of packet size. Periodic URLLC traffic may require one or more radio resources allocated to a wireless device in accordance with a traffic periodicity. Considering these requirements, a semi-static resource scheduling, such as semi-persistent scheduling, that may be dedicated to a wireless device for URLLC communications may not satisfy URLLC services and/or packet sizes, which may result in wasting radio resources and/or inefficient resource utilization.

A grant-based (GB) UL transmission, or a dynamic grant UL transmission, may not satisfy URLLC or other requirements. In grant-based (GB) UL transmission, one or more dynamic UL grants may be given to a wireless device based upon a service request (SR) transmitted from the wireless device to a base station. The grant-based (GB) UL transmission may comprise, for example, transmitting an SR from a wireless device to a base station, receiving from the base station one or more UL grants corresponding to the SR, and transmitting by the wireless device one or more transport blocks based on the received one or more dynamic UL grants. In order to satisfy stringent latency requirement, for example, for URLLC services, a transmission scheduling, process, and/or scheme without a dynamic UL grant may be used to reduce a latency of the GB UL transmission.

An uplink (UL) transmission without a dynamic UL grant, which may be referred to as a grant-free (GF) UL transmission or a configured grant transmission, may be supported. Configured grant transmissions may be supported for one or more service types, including, for example, URLLC. A base station may allocate to a wireless device one or more configured grant radio resources. The wireless device may be configured by the base station to use the configured grant radio resources to transmit, via the configured grant radio resources without a dynamic UL grant, one or more data packets. By using configured grant radio resources, without a dynamic UL grant, a wireless device may be able to reduce signaling overhead relative to a GB UL transmission. A service type that may have strict requirements, for example in terms of latency and reliability, such as in URLLC, may be a candidate for which a base station may configure a wireless device with the configured grant transmission. The wireless device configured with the configured grant radio resource may skip a UL transmission via the configured grant radio resource, for example, if the wireless device does not have data to transmit.

Configured grant transmissions may be used for URLLC service that may have a different requirement (e.g., for latency, reliability, etc.) relative to other types of services that may be associated with a dynamic grant. A wireless device may determine an optimized bundling size based on a type of grant. A bundling size that may be optimal for a dynamic grant (or a service associated with a dynamic grant), may not be optimal for a configured grant (or a service, e.g., URLLC, that may be associated with a configured grant). A service, such as a URLLC service, that may be associated with a configured grant may require a larger size of bundling to fulfill one or more requirements, for example, for latency and/or reliability, relative to a bundling size that may be optimal for a dynamic grant. Using an optimal bundling size for a configured grant as the bundling size for a dynamic grant may result in unnecessary uplink resources allocated for the dynamic grant. Using an optimal bundling size for a dynamic grant as the bundling size for a configured grant may result in insufficient resources allocated for the configured grant. Service requirements and/or resource efficiencies may not be satisfied, for a configured grant and/or for a dynamic grant, if a non-optimal bundling size is used and/or if a single bundling size is used for a configured grant and a dynamic grant. Dedicated bundling parameters for each of a configured grant and a dynamic grant may be used to provide optimal bundling sizes for each grant type. Power consumption of a wireless device may be reduced based on using an optimized bundling size for each grant type, for example, if the wireless device not transmit unnecessary retransmissions. Uplink transmission failure of a wireless device may be reduced based on using an optimized bundling size for each grant type, for example, if the wireless device is assigned a sufficient amount of uplink resources to reliably transmit data of a particular service.

One or more transport blocks (TBs) for a configured grant transmission or a dynamic grant transmission may be retransmitted within a bundle. Transmissions within a bundle may be used for TTI bundling (e.g., in LTE), slot aggregation (e.g., in NR), or any other form of bundling. TBs may be transmitted one or more times (e.g., a quantity n number of times) within a bundle. By retransmitting one or more TBs within a bundle, a wireless device may improve the likelihood that a base station receives the one or more TBs. Bundling transmissions may be used, for example, for low latency and/or high reliability services (e.g., URLLC services), and/or if a wireless device is near a cell edge. A base station may trigger bundling for a dynamic grant transmission, for example, if the base station determines that the wireless device is near a cell edge and/or if the base station determines that it is not successfully receiving TBs from the wireless device. A base station may trigger bundling for a configured grant transmission, for example, if the transmission requires low latency and/or high reliability (e.g., URLLC services). A wireless device may bundle transmissions, for example, to increase reliability of the base station receiving the TBs. A number of transmissions may be referred to as K repetitions (e.g., repK), which may be optimized and/or used for configured grant transmission. A number of transmissions may be referred to as TTI_BUNDLE_SIZE (e.g., pusch-AggregationFactor), which may be optimized and/or used for dynamic grant transmission. The value of K may be different from (e.g., less than) the value of TTI_BUNDLE_SIZE. A wireless device may receive one or more parameters indicating a number of K repetitions and a number of TTI-BUNDLE_SIZE. The wireless device may select a number of repetitions that is the greater of K and TTI_BUNDLE_SIZE, for example, which may increase reliability of the base station receiving TBs such as for URLLC services. The wireless device may select a number of repetitions that is the lesser of K and TTI_BUNDLE_SIZE, for example, for services that may not require high reliability or low latency, if the wireless device is close to the base station, and/or if the wireless device is not close to a cell edge. A base station may configure a wireless device with a number of K repetitions for a configured grant transmission and a number of TTI_BUNDLE_SIZE for a dynamic grant transmission. The wireless device may terminate a number of transmissions within a bundle of repetitions, for example, if the wireless device receives, from a base station, downlink control information (DCI) comprising HARQ feedback of the bundle. The wireless device may change a number of repetitions, for example, if it receives a new uplink grant in a DCI message.

Configured grant transmission may support multiple wireless devices to access the same configured grant radio resources (e.g., a GF radio resource pool), which may reduce latency, and reduce signaling overhead, relative a GB UL transmission. A GF radio resource pool may comprise a subset of one or more radio resources from a common radio resource set (e.g., from all uplink shared channel radio resources). A GF radio resource pool may be used to allocate exclusive, or partially overlapped, one or more radio resources for configured grant transmissions in a cell. A GF resource pool may be used to organize frequency and/or time reuse between different cells or parts of a cell (e.g., at a cell-center and/or at a cell-edge).

A collision may occur between configured grant transmissions of two or more wireless devices, for example, if a base station configures multiple wireless devices with the same (or partially overlapped) GF radio resource pool. The base station may configure one or more parameters to assign a wireless device specific demodulation reference signal (DMRS), along with the GF radio resource pool configuration, in order to identify a wireless device ID. One or more parameters may indicate one or more of a root index of a set of Zadoff-Chu (ZC) sequences, a cyclic shift (CS) index, a TDM/FDM pattern index, or an orthogonal cover code (OCC) sequence or index.

A base station may use one or more preamble sequences that may be transmitted together with the PUSCH data, for example, for a wireless device ID identification. One or more preamble sequences may be designed to be reliable enough and to meet a detection requirement of a service, for example, URLLC. A preamble sequence may be uniquely allocated to a wireless device, for example, for wireless devices configured with a GF radio resource pool. A base station may configure different GF radio resources for different sets of wireless devices such that the preamble sequences may be reused in different GF radio resources. The preamble sequences may be mutually orthogonal, e.g. orthogonality between ZC root sequences with different cyclic shifts, which may provide reliable detection performance. A wireless device may transmit one or more preambles together with the data block in a first step and receive a response in a second step. The data from the data block may be repeated K times depending on a base station configuration. The one or more preambles may not be repeated. The response from the base station may be, for example, a UL grant, or a dedicated ACK and/or NACK that may be transmitted in the form of downlink control information (DCI).

A GF resource pool configuration may or may not be known to one or more wireless devices. A GF resource pool may be coordinated between different cells, for example, for interference coordination. GF resource pools may be semi-statically configured by wireless device-specific RRC signaling (e.g., if the GF resource pools are known to those wireless devices) or by non-wireless device-specific RRC signaling (e.g., via broadcasting a system information block). The RRC signaling for GF radio resource configuration may include one or more parameters indicating one or more of the following: periodicity and offset of a resource with respect to SFN=0, time domain resource allocation, frequency domain resource allocation, wireless device-specific DMRS configuration, a modulation and coding scheme (MCS), a transport block size (TBS), number of repetitions K, a hopping pattern, HARQ related parameters, or power control related parameters. A wireless device may activate the configured grant transmission, that may be configured by the RRC signaling, after or in response to receiving the RRC signaling without an additional signaling.

An L1 activation signaling may be used, for example, with RRC signaling, to configure and/or activate a configured grant (e.g., GF) configuration. RRC signaling may configure one or more parameters of configured grant transmission to the wireless device. L1 activation signaling may activate, or deactivate, the configured grant transmission. L1 activation signaling may be used to activate, configure, adjust, modify, and/or update one or more parameters associated with configured grant transmission.

The L1 activation signaling may be transmitted via a PDCCH in the form of DCI, such as DCI used in UL semi-persistent scheduling (SPS). A base station may assign a radio network temporary identifier (RNTI), for a wireless device, along with configured grant configuration parameters in the RRC signaling. Using the assigned RNTI, the wireless device may monitor the PDCCH to receive L1 activation signaling that may be masked by the RNTI. An uplink grant may be configured via RRC (e.g., for configured grant Type 1) or an uplink grant may be provided via PDCCH signaling (e.g., for configured grant Type 2) which may be addressed to a CS-RNTI.

RRC configuration and/or reconfiguration of configured grant transmission without a dynamic UL grant may comprise one or more of periodicity of a resource or power control related parameters. L1 activation signaling may provide one or more of the following parameters for the configured grant resource: offset associated with the periodicity with respect to a timing reference, time domain resource allocation, frequency domain resource allocation, wireless device-specific DMRS configuration, an MCS and/or TBS value, HARQ related parameters, number of repetitions K, or a hopping pattern.

An MCS may be indicated by the wireless device within grant-free data. A number of MCS levels may be pre-configured by a base station, for example, to avoid blind decoding of MCS indication. K bits may be used to indicate MCS of grant-free data, where K may be as small as possible. The number of resource elements used to transmit MCS indication in a resource group may be semi-statically configured. In a configured grant operation, there may be one common MCS for all wireless devices. The common MCS may be predefined or determined by one or more devices. There may be a tradeoff between a spectrum efficiency and decoding reliability, such that the spectrum efficiency may be reduced, if a low level of MCS is used, and the data transmission reliability may increase. A mapping rule, between multiple time and/or frequency resources for UL grant-free transmission and MCSs, may be determined based on system requirements (e.g., NR requirements). A wireless device may select a MCS based on a DL measurement and associated time and/or frequency resources to transmit UL data. The wireless device may select a MCS, based on the channel status, and increase the resource utilization.

A configured grant transmission may be activated in different ways, for example, via RRC signaling or via L1 activation signaling, if a wireless device is configured with a configured grant transmission. The need for L1 activation signaling may depend on service types, and the dynamic activation (e.g., activation via L1 activation signaling) may not be supported or may be configurable based on service and/or traffic considerations.

A base station may determine whether to configure a wireless device with or without L1 activation signaling. The determination may be based on, for example, traffic pattern, latency requirements, and/or other requirements. By using L1 activation signaling, a wireless device may transmit a data packet with configured time and/or frequency radio resource, for example, if the wireless device receives an L1 activation signaling from the base station. A wireless device may start a UL transmission with a configured GF radio resource at any moment, or in a certain time interval (which may be configured by RRC signaling or pre-defined) after the configuration is completed, for example, if the L1 activation signaling is not configured. A wireless device may activate the configured grant transmission after or in response to receiving the RRC signaling configuring the configured grant transmission.

An activation type (e.g., via RRC signaling or via L1 activation signaling) may be pre-configured. RRC signaling, transmitted from a base station to a wireless device to configure a configured grant transmission, may comprise an indicator that may be used to indicate whether the activation of the configured grant transmission requires an L1 activation signaling. If the indicator requires L1 activation signaling, the wireless device may wait for an L1 activation signaling and activate the configured grant transmission after or in response to receiving the L1 activation signaling. If L1 activation signaling is used, the wireless device may transmit an acknowledgement after or in response to receiving an L1 activation signaling to the base station to provide an indication as to whether the wireless device correctly receives the L1 activation signaling.

The configured grant transmission may be activated after or in response to the RRC signaling configuring the configured grant transmission, for example, if the indicator indicates L1 activation signaling is not required. For the activation of configured grant transmission without the L1 activation signaling, the wireless device may not determine when to start the configured grant transmission. The base station and the wireless device may predefine the start timing, for example, based on a time offset and the transmission time interval (TTI), such as a subframe, slot, or mini-slot, if the wireless device receives the RRC signaling for the configured grant transmission configuration. The RRC configuration may comprise one or more parameters indicating the start timing (e.g., in terms of a subframe, slot, or mini-slot).

RRC signaling may not contain an indicator as to whether the activation required a L1 activation signaling. A wireless device may implicitly know whether the configured grant transmission is activated by RRC signaling or L1 activation signaling, for example, based on a format of RRC configuration. For a configured grant transmission without L1 activation signaling, the RRC signaling for configuring and activating the configured grant transmission may comprise one or more parameters for the configured grant transmission. For a configured grant transmission activated by the L1 activation signaling, an RRC signaling may comprise a different number of parameters that may be less than a number of parameters in the RRC signaling activating the configured grant transmission. The absence of one or more parameters, and/or the number of parameters in the RRC signaling, may be an implicit indicator for a wireless device as to whether to activate the configured grant transmission, via RRC signaling or via L1 activation signaling.

The L1 activation signaling may comprise one or more parameters indicating one or more configured grant configurations, for example, start timing of configured grant transmission, configured grant time and frequency radio resources, DMRS parameters, a modulation and coding scheme (MCS), a transport block size (TBS), number of repetitions K, a hopping pattern, or power control parameters. A downlink control information (DCI) format used for the activation of the configured grant transmission may comprise one or more fields indicating a MCS for the configured grant transmission. The configured grant transmission requiring the L1 activation signaling may be configured with a RRC signaling that may not comprise one or more parameters indicating the MCS for the configured grant transmission. The MCS information may be carried by a L1 signaling which may activate the configured grant transmission. A wireless device may activate the configured grant transmission after or in response to the RRC signaling, without waiting for a L1 signaling, for example, if the wireless device receives a RRC signaling comprising a MCS for a configured grant transmission.

The L1 activation signaling may be configured to control network resource load and utilization, for example, if the service does not require high reliability and latency. For a delay sensitive service, the additional activation signaling may cause additional delay and may lead to potential service interruption and/or unavailability for the period of applying and requesting the activation. A base station may configure the wireless device with a configured grant transmission such that the configured grant transmission may be activated after or in response to the RRC signaling comprising a configured grant radio resource configuration and transmission parameters.

The configured grant radio resource may become over-allocated, which may result in a waste of radio resources, for example, with few wireless devices. L1 signaling may be used to reconfigure the configured grant radio resource or one or more configured grant transmission parameters. By allowing L1 signaling-based reconfiguration, wireless devices may periodically monitor a downlink control channel to detect the L1 signaling, scrambled by a RNTI, that may indicate whether the configured grant radio resources or parameters have changed. This monitoring may increase the power consumption of a wireless device, and the periodicity to check the downlink control signaling may be configurable. The periodicity may be configured to be short, such as every 1 minute or every radio frame, for example, if a radio resource utilization may be more important than a particular power consumption level. The periodicity may be configured to be long, such as every 1 hour, for example, if a power consumption level may be important than a particular monitoring periodicity. The periodicity to check downlink control signaling may be separated from the periodicity of configured grant transmission, for example, in order to shorten the latency. The periodicity of configured grant radio resource may be less than 1 ms, such as 0.125 ms, whereas the periodicity to check downlink control signaling may be greater, such as 1 minute or 1 hour. L1 deactivation signaling may be used for all services in order to release resources as fast as possible, for example, for deactivating the activated configured grant operation.

For the configured grant transmission, a base station may support a K number of repetitions of the same transport block (TB) transmission over the configured grant radio resource pool until one or more conditions are met. A wireless device may continue the repetitions up to K times for the same TB until one or more of the following conditions is met: if an UL grant (or HARQ ACK and/or NACK) is successfully received from the base station before the number of repetitions reaches K, the number of repetitions for the TB reaches K, or other termination condition of repetitions may apply.

The number of repetitions, K, may be a configurable parameter that may be wireless device-specific, and/or cell-specific. A unit of the K-repetition may comprise, for example, a mini-slot, a symbol, or any other period. A base station may configure the number of this repetition and the radio resource in advance, for example, via one or more RRC messages. The base station may transmit L1 activation signaling comprising a parameter indicating the number of repetitions K. The base station may assume a set of initial transmission and the repetition as one amount of the transmission. The base station may not be limited to only initial transmission or only repetition. The set of initial transmission and its one or more repetitions may comprise an extended TTI. The repetitions may not be necessarily contiguous in time. If the repetitions are contiguous in time, it may allow coherent combining. If the repetitions are not contiguous in time, it may allow time diversity.

A base station may fail to detect a plurality of wireless devices' data, for example, if the configured grant transmission of the plurality of wireless devices collides in the same GF radio resource pool. If two wireless devices retransmit the data without UL grants, the wireless devices may collide again. Hopping may be used to solve such a collision problem, for example, if radio resources are shared by multiple wireless devices. The hopping may randomize the collision relationship between wireless devices within a certain time interval that may avoid persistent collision. The hopping may bring a diversity gain on the frequency domain. A wireless device-specific hopping pattern may be pre-configured or may be indicated, for example, by RRC signaling or L1 activation signaling. The wireless device-specific hopping pattern may be generated based on a known wireless device-specific ID, for example, a wireless device-specific DMRS index and/or RNTI.

The hopping pattern may be determined from one or more factors, such as the number of resource units (RUs), the maximum number of wireless devices sharing the same RU, the recently used RU index, the recent hopping index or the current slot index, the information indicating recently used sequence, hopping pattern, or hopping rule. A sequence such as referenced above may be a DMRS, a spreading sequence, or a preamble sequence that may be wireless device-specific.

The repetitions parameter K may be configured by one or more RRC messages or L1 activation signaling. A wireless device configured with the repetitions parameter K may transmit a transport block (TB) K times. The wireless device may transmit the TB K times with the same redundancy version (RV) or the wireless device may transmit the TB K times with different RVs between the repetitions. The RV determination for K repetitions may comprise the initial transmission.

The RV determination may be fixed to a single value, fixed to a pre-defined RV pattern comprising a plurality of RVs, configured by one or more RRC messages with a single value, or configured by one or more RRC messages with a RV pattern comprising a plurality of RVs, for example, if the configured grant transmission is activated by one or more RRC messages. The RV determination may be fixed to a single value, fixed to a pre-defined RV pattern comprising a plurality of RVs, configured by the one or more RRC messages with a single value, configured by one or more RRC messages with a RV pattern comprising a plurality of RVs, or configured by the L1 activation signaling with a single value, or a RV pattern comprising a plurality of RVs, for example, if the configured grant transmission is (fully or partially) configured by one or more RRC messages and activated by L1 activation signaling.

A base station may switch between configured grant and dynamic grant UL transmissions, for example, to balance resource utilization and delay and/or reliability requirements of associated services. The configured grant transmissions may be based on a semi-static resource configuration that may be beneficial to reduce latency. Such a pre-defined resource configuration may be difficult to satisfy all potential services or packet sizes. The overhead may be large, and the packet size for a service, such as URLLC, may be variable. If a wireless device's data packet collides with other wireless device's packets in the configured grant transmission, a re-attempt to access configured grant radio resources may not achieve the service requirements and switching from configured grant to dynamic grant UL transmissions may be beneficial.

The initial transmission on the pre-configured configured grant radio resources may include wireless device identification (ID), for example, to support the switching between configured grant and dynamic grant UL transmissions. Wireless device identification may comprise explicit wireless device ID information (e.g., C-RNTI) or implicit wireless device information such as a DMRS cyclic shift (assuming use of ZC sequences) specific signature. The wireless device may include buffer status reporting (BSR) with the initial data transmission, for example, to inform a base station of whether the wireless device has remaining data to transmit. A base station may switch a type of scheduling for the wireless device from configured grant to dynamic grant UL transmissions, for example, if the base station successfully decodes data transmitted by a wireless device and determines (e.g. from a BSR report) that the wireless device has remaining data to transmit, and/or if the base station fails to decode data transmitted by the wireless device but successfully detects the wireless device ID from the uniquely assigned sequence (e.g., preamble and/or DMRS). The UL grant for subsequent data transmissions may be with CRC scrambled by the wireless device's RNTI (which may be determined, for example, by explicit signaling in the initial transmission or implicitly by the DMRS cyclic shift).

A termination condition, of one or more termination conditions, for the K-repetitions may be a reception of a DCI comprising an UL grant which schedules an UL transmission and/or retransmission for the same TB. A base station may assign dedicated resources for retransmission, for example, in order to ensure that the TB is delivered within the latency budget. Scheduling switching from configured grant to dynamic grant operation may comprise such assignment of dedicated resources for retransmission. A wireless device may be required to link the received grant with the transmitted TB, for example, to identify which TB is to be retransmitted, such as if there are multiple ongoing transmission processes at the wireless device. The wireless device and the base station may have the same notion of TB (and/or RV) counting.

The TB counting for the configured grant operation may not be possible, for example, if a base station may not detect one or more TBs, such as due to collisions. To make an association between a DCI with a TB, there may be one or more options. The wireless device may directly associate the DCI with a TB that is being transmitted, for example, if there is no other transmission process at the wireless device side. A wireless device may determine that the DCI is for a particular TB by applying an implicit linkage that may assume only one TB is transmitted in one transmission interval, for example, if there are at least two different TBs. If the interval between detected wireless device transmission and a grant is fixed, the interval may determine which TB may be retransmitted. If the timing between a detected transmission and a retransmission grant is not preconfigured, an explicit indication of the retransmitted TB may be carried by DCI. If a wireless device detects that a grant for one TB overlaps with a transmission of another ongoing TB, the wireless device may assume precedence of the grant relative to the grant-free retransmissions. If a grant is received for a new TB (e.g., for aperiodic CSI reporting) and if the grant overlaps with the configured grant transmissions, the configured grant transmissions may be dropped in the resources. Additionally or alternatively, a prioritization rule whether to transmit a triggered report or configured grant data may be used, for example, depending on priority of the associated services. For services such as URLLC services, the CSI reporting may be dropped.

A dedicated, pre-assigned channel may be used for early termination. A physical HARQ indicator channel (PHICH) may be used as an acknowledge indicator. The PHICH for a wireless device may be determined based on the physical resource block (PRB) and cyclic shift of the DMRS corresponding to the wireless device's PUSCH transmission. Similar design principle may be used for a configured grant transmission. The early termination based on a PHICH-like channel may improve the control channel capacity and system capacity. If a base station has successfully received a TB, the base station may obtain the corresponding information about the transmission of the TB, such as the wireless device ID, the resource employed for carrying this transmission, and/or the DMRS employed for this transmission. The physical resources may be shared among multiple wireless devices that may have their own unique identifiers (e.g., DMRS) used in the configured grant radio resource pool. If the base station has successfully received a TB, a unique PHICH may be determined, for example, even for configured grant transmission.

A sequence based signal may be used for early termination of K-repetition. The sequence based signal may be transmitted, via one or more pre-assigned channels, to inform the wireless device to terminate the repetition of transmission. The signal may be transmitted if a base station successfully decodes a TB. The wireless device may perform a simple signal detection for the presence or absence to decide whether to continue the repetitions.

A base station may switch from configured grant to dynamic grant UL transmissions, for example, to improve a configured grant radio resource shortage. One or more wireless devices having delay requirements that are not strict (e.g., relative to URLLC requirements) may use the configured grant radio resource to transmit a data packet. The base station may measure a level of congestion of the configured grant radio resource shared by a plurality of wireless devices based on statistics, for example, resource utilization, load, and/or a number of wireless devices sharing the configured grant radio resource and having set up a threshold policy to dynamically balance load or resource utilization of the configured grant radio resource. If the resource usage statistic of the configured grant radio resource exceeds a threshold, which may be predefined, switching some wireless devices from the configured grant radio resource to the dynamic grant UL radio resource may provide benefits such as decreased resource collision.

TTI bundling may be supported to reduce a latency and/or to improve a reception of uplink transmission at a base station. The TTI bundling may comprise transmission of at least one TB, one or more times via one or more TTIs (e.g., the TTI may be a mini-slot, slot, or subframe), without waiting for HARQ ACK or NACK from the base station.

A wireless device may transmit to a base station power headroom reporting. The power headroom reporting may provide the base station with information about the difference between the nominal wireless device maximum transmit power and the estimated power for uplink shared channel (UL-SCH) transmission or sounding reference signal (SRS) transmission per activated serving cell. The power headroom reporting may provide to the base station information about the difference between the nominal wireless device maximum power and the estimated power for UL-SCH and NR-PUCCH transmission on a special cell (SpCell) and NR-PUCCH secondary cell (SCell). The wireless device may transmit to the base station the measurement report to provide with information about the downlink reference signal measurement, for example, reference signal receive power (RSRP).

A base station may trigger the TTI bundling, for example, to improve the coverage of UL transmission for a power limited wireless device at a cell edge area or other area where the wireless device may not have enough power to transmits a data packet. The base station may identify the power limited wireless device at the cell edge area based on the power headroom reporting and/or the measurement report. The base station may configure the wireless device with a TTI bundling via one or more RRC messages. One or more RRC messages may comprise an information element (IE), for example, MAC-MainConfig IE or PUSCH-Config, that may indicate whether the TTI bundling is enabled (e.g., ttiBundling=TRUE and/or an absence of a parameter indicating a bundling size) or disabled (e.g., ttiBundling=FALSE and/or a present parameter indicating a bundling size within a value of bundling size or an RV pattern).

A wireless device that receives the one or more RRC messages enabling the TTI bundling may transmit the same transport block TTI_BUNDLE_SIZE times in TTI_BUNDLE_SIZE TTIs without waiting for HARQ ACK or NACK between the repetitions of the same transport block. TTI_BUNDLE_SIZE may be fixed (or pre-configured) to, for example, 4, or any other value. TTI_BUNDLE_SIZE may be fixed to, for example, 1, 2, 3, 4, 5, 6, 7, 8, or any other value. TTI_BUNDLE_SIZE may be configured by an RRC message semi-statically.

A wireless device configured with the TTI bundling may repeat a transmission of a TB with different redundancy versions (RVs) in TTI_BUNDLE_SIZE TTIs. The RV pattern (e.g., the order of RVs) may be fixed or pre-configured.

For a given TB to be transmitted by a wireless device, the wireless device may transmit RV=0, RV=2, RV=3, and RV=1 of the given TB in, for example, 4 subframes if TTI_BUNDLE_SIZE is fixed to 4 with an RV pattern {0, 2, 3, 1}. A base station may configure a wireless device with a TTI bundling and transmit downlink control information (DCI), for example, DCI0, in subframe n−4. The wireless device that detects the DCI may transmit a first RV in subframe n and may transmit non-adaptive retransmissions (e.g., repetition of the same transport block with different RVs based on a pre-defined RV pattern) in n+1, n+2, and n+3 with corresponding RVs (e.g., the RV pattern may be set to 0, 2, 3, and 1) if TTI_BUNDLE_SIZE is fixed to 4. The wireless device may expect or monitor for a HARQ ACK and/or NACK corresponding the transmission and/or re-transmission of the bundle, for example, in subframe n+7.

Each transmission and/or re-transmission of the bundle may use the same HARQ process. Within a bundle, HARQ re-transmissions may be triggered without waiting for feedback for previous transmissions. The HARQ feedback of a bundle may be received for the last TTI of the bundle regardless of whether a transmission in that TTI takes place, for example, if a measurement gap occurs. The measurement gap may start in subframe 1, and the measurement GAP may be until, for example, subframe 6. The wireless device may still expect or monitor for HARQ feedback, for example, in subframe 7, even if transmissions and/or retransmissions in subframes 1, 2, and 3 may not occur.

If a TTI bundling is configured, a parameter TTI_BUNDLE_SIZE may provide the number of TTIs of a TTI bundle. TTI bundling operation may rely on the HARQ entity for invoking the same HARQ process for a transmission that is part of the same bundle. Within a bundle, HARQ retransmissions may be triggered, without the wireless device waiting for feedback from previous transmissions, based on TTI_BUNDLE_SIZE. The HARQ feedback of a bundle may be received, by the wireless device, for the last TTI of the bundle (e.g., the TTI corresponding to TTI_BUNDLE_SIZE), regardless of whether a transmission in that TTI takes place (e.g. when a measurement gap occurs). A retransmission of a TTI bundle may be a TTI bundle.

For an uplink transmission, a wireless device may encode a transport block into one or more redundancy versions, for example, by using channel coding. For the uplink transmission without TTI bundling, the wireless device may transmit a first redundancy version in a TTI (e.g., a mini-slot, slot, or subframe). Subsequent transmissions of the transport block may be dependent on the HARQ ACK, or NACK, which may be transmitted 4 TTI durations later or more after the first transmission.

With a TTI bundling, the different redundancy versions may be transmitted in one or more TTIs without waiting for the HARQ ACK and/or NACK feedback and a combined ACK/NACK may be transmitted from a base station after processing the transmissions of redundancy versions associated with the transport block.

One transmission of a PDCCH may be sufficient to control the multiple transmissions of a TTI bundling and may save a control signaling overhead. One time HARQ ACK/NACK transmission corresponding to multiple transmissions of the TTI bundling after processing may reduce the error rate of a transport block relative to an error rate of processing a single redundancy version. One time HARQ ACK and/or NACK transmission may reduce the delay in the HARQ process relative to a delay in the transmissions of the redundancy versions separated in time without using the TTI bundling. Combined processing of the different RVs' transmissions over multiple TTIs may improve a probability of detection of the transport block. A wireless device with limited power may improve a probability of a successful transmission with lesser latency by using TTI bundling.

A base station may not configure, and/or may not activate, a transmission with a TTI bundling on a wireless device that overlaps in time with an activated configured grant transmission. Activating the TTI bundling and configured grant transmission at the same time may result in a conflict between a number of transmission repetitions configured by the TTI bundling and a number of transmission repetitions configured by the configured grant transmission. To avoid a conflict, the base station may not trigger the TTI bundling if the configured grant transmission is activated.

A base station may configure, and/or may activate, a transmission with a TTI bundling on a wireless device that overlaps in time with an activated configured grant transmission. The activated configured grant transmission may be configured for one or more services (e.g., for URLLC traffic or uplink channel information piggybacking). The wireless device may move to the cell edge area, or other area, for example, where the wireless device may not have enough power to transmit a data packet. Based on the power headroom reporting and/or measurement reports from the wireless device, the base station may determine whether the wireless device has sufficient power to transmit a data packet. The base station may trigger a TTI bundling, on the wireless device configured with the configured grant transmission, via one or more RRC messages. The wireless device may use either the TTI bundling or K repetition configured in the configured grant transmission, for example, if the wireless device transmits a data packet associated with the one or more services. The wireless device may ignore the repetition K configured for the configured grant transmission and the wireless device may apply the TTI bundling to the data packet transmission. The wireless device may apply the TTI bundling to a data packet transmitted via one or more radio resources not associated with the configured grant radio resources. For a data packet transmitted via one or more configured grant radio resources, a wireless device may ignore the repetition K configured for the configured grant transmission and the wireless device may apply the TTI bundling the data packet transmission via the one or more configured grant radio resources. For a wireless device configured with TTI_BUNDLE_SIZE for the TTI bundling, and a repetition K for the configured grant transmission, the wireless device may repeat a transmission of a TB associated with the configured grant transmission TTI_BUNDLE_SIZE times regardless of the repetition K configured for the TTI bundling.

TTI_BUNDLE_SIZE may be fixed (e.g., pre-configured) or configured by one or more RRC messages. During the TTI bundling, the wireless device may transmit the TB TTI_BUNDLE_SIZE times with the same RV, and/or the wireless device may transmit the TB TTI_BUNDLE_SIZE times with different RVs between the repetitions. The RV determination may be fixed to a single value. The RV determination may be fixed to a pre-defined RV pattern comprising a plurality of RVs. The RV determination may be fixed, pre-configured, or configured by the one or more RRC messages, with a single value or with a RV pattern comprising a plurality of RVs.

The wireless device may apply a TTI bundling to a data packet, transmitted via one or more radio resources not associated with the configured grant radio resources, for example, if the base station configures, and/or activates, a transmission with a TTI bundling on the wireless device that overlaps in time with an activated configured grant transmission. For the data packet transmitted via one or more configured grant radio resources, the wireless device may ignore the TTI bundling and follow one or more parameters configured for the configured grant transmission. For the configured grant transmission, the wireless device may use one or more configured grant configuration parameters, for example, indicating the repetition K for repeating a transmission of a TB regardless of TTI BUNDLE SIZE configured for the TTI bundling. An RV pattern used for the repetition of the transmission of the TB K times may correspond to the one or more configured grant configuration parameters.

For the configured grant transmission, the repetitions parameter K may be configured, for example, by one or more RRC messages or L1 activation signaling. The wireless device may transmit the TB K times with the same RV, and/or the wireless device may transmit the TB K times with different RVs between the repetitions. The RV determination may be fixed to a single value or the RV determination may be fixed to a pre-defined RV pattern comprising a plurality of RVs. The RV determination may be configured by the one or more RRC messages, or by L1 activation signaling, with a single value or with a RV pattern comprising a plurality of RVs.

The wireless device may activate the TTI bundling, for example, after or in response to receiving one or more RRC messages comprising a parameter indicating the TTI bundling is enabled. The wireless device may activate the configured grant transmission, after or in response to receiving one or more RRC messages comprising configured grant related parameters, such as periodicity and offset of a resource with respect to SFN=0, time domain resource allocation, frequency domain resource allocation, wireless device-specific DMRS configuration, a modulation and coding scheme (MCS), a transport block size (TBS), number of repetitions K, a hopping pattern, HARQ related parameters, or power control related parameters. The type of configured grant configuration and/or transmission activated after or in response to the one or more RRC messages may be referred to as configured grant Type 1.

The wireless device may be configured, with a configured grant transmission, via one or more RRC messages comprising configured grant related parameters. The wireless device may activate the configured grant transmission after or in response to receiving a L1 activation signaling. The configured grant related parameters may indicate one or more of following: periodicity of a resource, number of repetitions K, a hopping pattern, or power control related parameters. The L1 activation signaling may provide one or more of the following parameters: offset associated with the periodicity with respect to a timing reference, time domain resource allocation, frequency domain resource allocation, wireless device-specific DMRS configuration, an MCS and/or TBS value, HARQ related parameters, number of repetitions K, or a hopping pattern. The type of configured grant configuration and/or transmission activated after or in response to receiving the L1 activation signaling may be referred to as configured grant Type 2.

A base station may configure and/or activate a transmission with a TTI bundling on a wireless device that overlaps in time with an activated configured grant transmission. The wireless device may apply the TTI bundling to a data packet transmitted via one or more radio resources not associated with the configured grant radio resources. For a data packet transmitted via one or more configured grant radio resources, a wireless device may select a value in a range, from TTI_BUNDLE_SIZE for the TTI bundling to a repetition K for the configured grant transmission, as a number of repetitions that the wireless device may transmit and/or retransmit transmit the same TB. The wireless device may select a value that has a larger (or smaller) number, for example, select TTI_BUNDLE_SIZE if TTI_BUNDLE_SIZE>K, otherwise select K; or select K if TTI_BUNDLE_SIZE>K, otherwise select TTI_BUNDLE_SIZE. The RV pattern during the repetition may follow the repetition process associated with the selected repetition parameter. If the wireless device selects TTI_BUNDLE_SIZE as a repetition parameter, the RV pattern may follow a first RV pattern (e.g., repetition of a single RV or transmission of different RVs) configured for the TTI bundling, wherein the first RV pattern may be fixed, pre-configured, or configured by RRC signaling. If the wireless device selects K as a repetition parameter, the RV pattern may follow a second RV pattern (e.g., repetition of a single RV or transmission of different RVs) configured for the configured grant transmission, wherein the second RV pattern may be configured by RRC signaling or L1 activation signaling.

A base station may transmit, and a wireless device may receive, one or more messages. The one or more messages may comprise one or more of: an RRC message, a MAC message, an L1 signal, or a physical downlink control channel message. The one or more messages may comprise a first parameter (e.g., K repetition) indicating a first number of transmissions of a first transport block within a bundle of a configured grant (e.g., Type 1 or Type 2); a second parameter (e.g., TTI_BUNDLE_SIZE) indicating a second number of transmissions of a second transport block within a bundle of a dynamic grant; any other parameter indicating another number of transmissions of another transport block within a bundle of another grant; and/or a parameter indicating a sequence of redundant versions of the a transport block (e.g., the first transport block or the second transport block). The configured grant may be for one or more first UL transmissions of a configured grant Type 1. The configured grant may be for one or more second UL transmissions of a configured grant Type 2. The base station may transmit, and the wireless device may receive, an uplink grant for scheduling a transport block. The base station may transmit, and the wireless device may receive, an activation command for the configured grant. The activation command may be configured via RRC or via a physical downlink control channel. The wireless device may activate, after receiving the one or more messages, the configured grant Type 1 and/or the configured grant Type 2. The wireless device may activate, after receiving the one or more messages in a control command transmitted via a physical downlink control channel, the configured grant Type 2. The wireless device may transmit (e.g., in an initial transmission), via at least one radio resource of the configured grant, a first transport block. The wireless device may transmit, based on the first parameter value, one or more first retransmissions (e.g., K−1 retransmissions) of the first transport block within the bundle of the configured grant. The wireless device may retransmit the first transport block without waiting for feedback from the initial transmission of the first transport block. The base station may receive the transmissions of the first transport block (e.g., the initial transmission and K−1 retransmissions). The wireless device may terminate the one or more first transmissions based on one or more of: receiving an uplink grant for scheduling the first transport block, or a number of transmissions of the first transport block being equal to the first parameter. The base station may transmit a first dynamic grant indicating one or more second radio resources. The wireless device may receive the first dynamic grant. The wireless device may transmit (e.g., in an initial transmission), via at least one of the one or more second radio resources, the second transport block. The wireless device may transmit, based on the second parameter value, one or more second retransmissions (e.g., TTI_BUNDLE_SIZE-1 retransmissions) of the second transport block within the bundle of the dynamic grant. The wireless device may retransmit the second transport block without waiting for feedback from the initial transmission of the second transport block. The base station may receive the transmissions of the second transport block (e.g., the initial transmission and TTI_BUNDLE_SIZE-1 retransmissions). The wireless device may terminate the one or more second transmissions based on a number of transmissions of the second transport block being equal to the second parameter.

A configured grant UL transmission may comprise: a grant free (GF) UL transmission, a configured grant Type 1 UL transmission, an uplink semi-persistent scheduling (SPS) UL transmission, a configured grant Type 2 UL transmission, or an UL transmission without dynamic grant. Configured grant may refer to GF, and/or GF may refer to configured grant. Configured grant transmission may refer to GF UL transmission, and/or GF UL transmission may refer to configured grant transmission. A dynamic grant UL transmission may comprise a grant based (GB) UL transmission, or a UL transmission with dynamic grant. Dynamic grant may refer to GB, and/or GB may refer to dynamic grant. Dynamic grant transmission may refer to UL transmission with dynamic grant.

Figure 15:
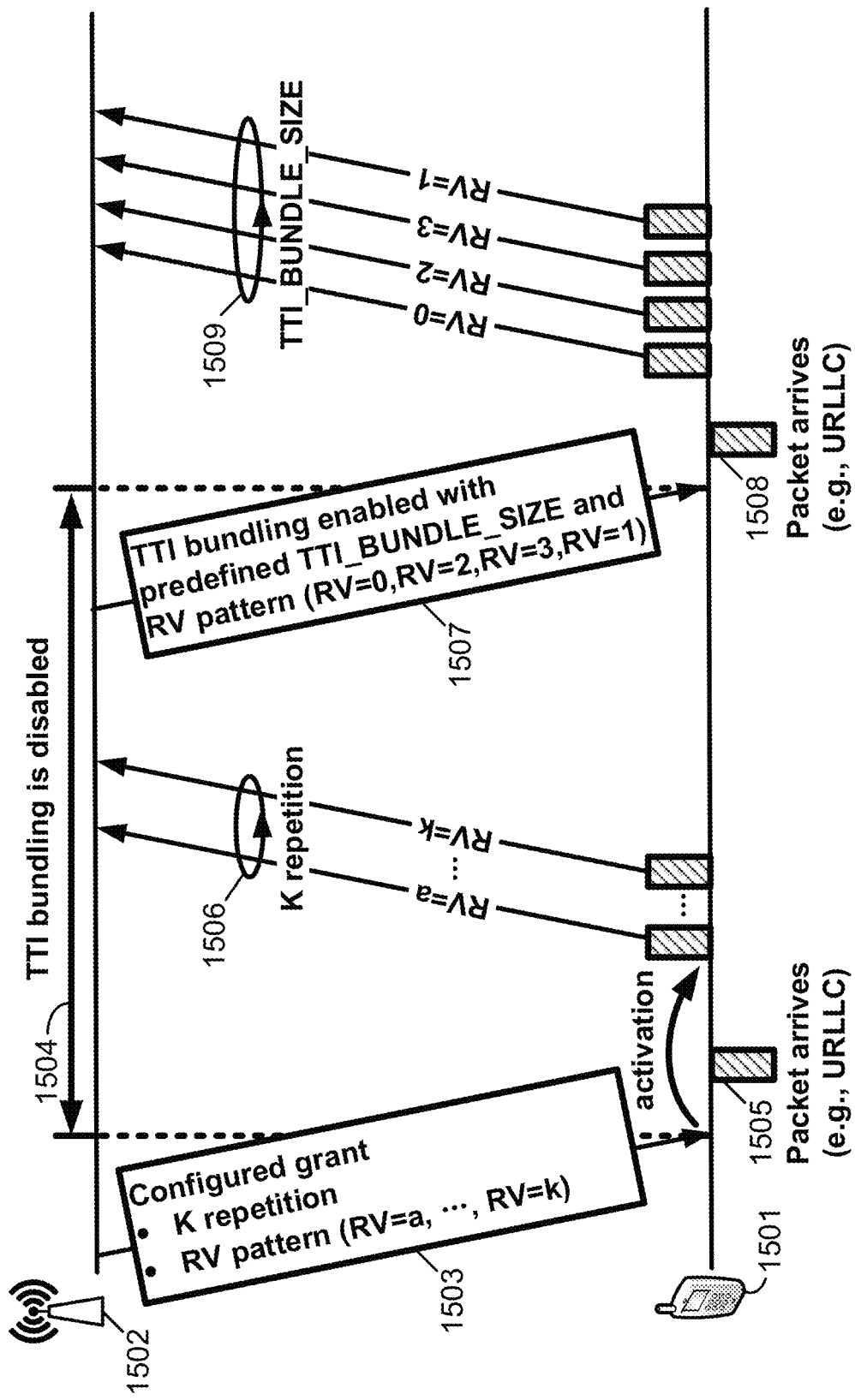
FIG. 15 shows an example for uplink transmission using different repetition values based on whether transmission time interval (TTI) bundling is disabled or enabled.

FIG. 15 shows an example for UL transmission, for example, using different repetition values depending on whether TTI bundling is disabled or enabled. TTI bundling may have a priority over K-repetition of GF configuration. A base station 1502 may transmit, to a wireless device 1501, one or more messages 1503 comprising a GF configuration (e.g., Type 1). The one or more messages 1503 may comprise one or more values for K repetitions and/or one or more RV patterns (e.g., RV=a, RV=b, . . . RV=k). The base station 1502 may transmit the one or more messages 1503 via RRC messaging. The wireless device 1501 may receive the one or more messages 1503. After or in response to receiving the one or more messages 1503, the wireless device 1501 may be activated for a transmission of one or more packets. One or more packets 1505 may arrive for a transmission (e.g., for a URLLC service), for example, after GF configuration is activated but with TTI bundling disabled (e.g., during time period 1504). The wireless device 1501 may transmit, during time period 1504, when TTI bundling may be disabled, and/or when configured grant transmission may be configured and/or activated, K number of repetitions 1506 of the one or more packets 1505. Each of the K number of repetitions 1506 may be transmitted with a RV corresponding to a RV pattern in the one or more messages 1503.

The base station 1502 may transmit, to the wireless device 1501, one or more messages 1507 comprising an indication and/or a command to enable TTI bundling. The one or more messages 1507 may comprise one or more values for TTI_BUNDLE_SIZE number of repetitions and/or one or more RV patterns (e.g., RV=0, RV=2, . . . RV=n). The wireless device 1501 may receive the one or more messages 1507. After or in response to receiving the one or more messages 1507, the wireless device 1501 may enable TTI bundling. One or more packets 1508 may arrive for a transmission (e.g., for a URLLC service), for example, after TTI bundling is enabled. The wireless device 1501 may transmit, after time period 1504, when TTI bundling may be enabled, a TTI_BUNDLE_SIZE number of repetitions 1509 of the one or more packets 1508. Radio resources that the wireless device 1501 may use to transmit the one or more packets 1508 with the TTI_BUNDLE_SIZE number of repetitions 1509 may be GF radio resource indicated by the one or more message 1503. Each of the TTI_BUNDLE_SIZE number of repetitions 1509 may be transmitted with a RV corresponding to a RV pattern in the one or more messages 1507. The one or more RV patterns in the one or more messages 1507 may be different from the one or more RV patterns in the one or more messages 1503. The value of K may be different from the value of TTI_BUNDLE_SIZE.

The base station 1502 may activate a TTI bundling (e.g., via the one or more messages 1507) and/or a configured grant transmission (e.g., via the one or more messages 1503) for the wireless device 1501 at any time period. If a TB is scheduled to transmit, via a GF radio resource, the wireless device 1501 may ignore one or more configured GF parameters indicating repetition K (e.g., from the one or more messages 1503) and repeat a transmission of the TB with a single RV or different RVs according to a RV pattern of the TTI bundling (e.g., from the one or more messages 1507), for example, if TTI bundling is enabled (e.g., via the one or more messages 1507). Any RV pattern may be fixed, or pre-configured, or configured (e.g., via the one or more messages 1503 and/or the one or more messages 1507). An RV pattern may be configured by one or more RRC messages, for example, configuring and/or activating the TTI bundling. An RV pattern may indicate whether the wireless device 1501 repeats the transmission of the TB with a single RV or different RVs. During the repetition of the TB transmission associated with the GF radio resource, the wireless device 1501 may receive a HARQ feedback of a bundle for the last TTI of the bundle (e.g., the TTI corresponding to TTI_BUNDLE_SIZE), regardless of whether a transmission in that TTI takes place or not (e.g., if a measurement gap occurs). If a TB is scheduled to transmit, via a radio resource not associated with a GF radio resource, the wireless device 1501 may apply the TTI bundling to the transmission of the TB. The wireless device 1501 may repeat a transmission of the TB TTI_BUNDLE_SIZE times (e.g., if TTI bundling is enabled) or K times (e.g., if TTI bundling is disabled). With the TTI bundling, the wireless device 1501 may receive HARQ ACK and/or NACK with a time offset, for example, after completing or during one or more transmission of the bundle.

Figure 16:
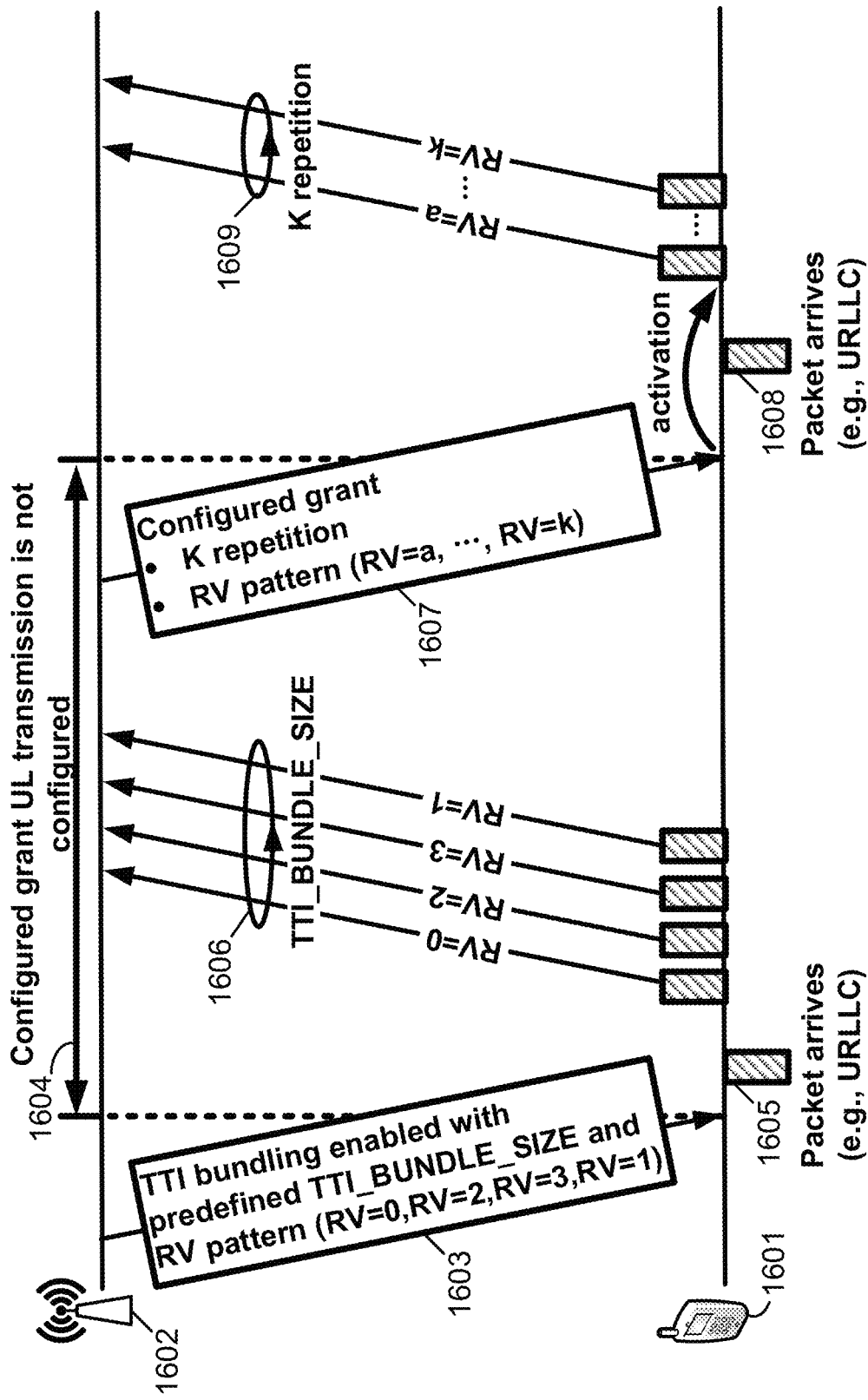
FIG. 16 shows an example for uplink transmission using different repetition values based on whether configured grant uplink transmission is configured or not configured.

FIG. 16 shows an example for UL transmission, for example, using different repetition values depending on whether configured grant transmission is configured or not configured. K-repetition of configured grant transmission may have a priority over TTI bundling for configured grant transmission. A base station 1602 may transmit, to the wireless device 1601, one or more messages 1603 comprising an indication and/or a command to enable TTI bundling. The one or more messages 1603 may comprise one or more values for TTI_BUNDLE_SIZE number of repetitions and/or one or more RV patterns (e.g., RV=0, RV=2, . . . RV=n). The wireless device 1601 may receive the one or more messages 1603. After or in response to receiving the one or more messages 1603, the wireless device 1601 may enable TTI bundling. One or more packets 1605 may arrive for a transmission (e.g., for a URLLC service), for example, after TTI bundling is enabled but with configured grant transmission not configured (e.g., during time period 1604). The wireless device 1601 may transmit, during time period 1604, when TTI bundling may be enabled, and/or when configured grant transmission may not be configured and/or may be deactivated, a TTI_BUNDLE_SIZE number of repetitions 1606 of the one or more packets 1605. Each of the TTI_BUNDLE_SIZE number of repetitions 1606 may be transmitted with a RV corresponding to a RV pattern in the one or more messages 1603.

The base station 1602 may transmit, to the wireless device 1601, one or more messages 1607 comprising a GF configuration (e.g., Type 1). The one or more messages 1607 may comprise one or more values for K repetitions and/or one or more RV patterns (e.g., RV=a, RV=b, . . . RV=k). The base station 1602 may transmit the one or more messages 1607 via RRC messaging. The wireless device 1601 may receive the one or more messages 1607. After or in response to receiving the one or more messages 1607, the wireless device 1601 may be activated for a transmission of one or more packets. One or more packets 1608 may arrive for a transmission (e.g., for a URLLC service), for example, after GF configuration is activated. The transmission of the one or more packets may be scheduled via GF radio resources indicated by the GF configuration. The wireless device 1601 may apply a TTI bundling to a data packet, transmitted via one or more radio resources not associated with the GF radio resources. For the data packet transmitted via one or more GF radio resources, the wireless device 1601 may ignore the TTI bundling and follow one or more parameters configured for the configured grant transmission. For the configured grant transmission, the wireless device 1601 may use one or more GF configuration parameters, for example, indicating the repetition K for repeating a transmission of a TB regardless of TTI BUNDLE SIZE configured for the TTI bundling. The wireless device 1601 may transmit, after time period 1604 when configured grant transmission may be configured and/or activated, K number of repetitions 1609 of the one or more packets 1608. Each of the K number of repetitions 1609 may be transmitted with a RV corresponding to a RV pattern in the one or more messages 1607. The one or more RV patterns in the one or more messages 1607 may be different from the one or more RV patterns in the one or more messages 1603. The value of K may be different from the value of TTI_BUNDLE_SIZE.

The base station 1602 may activate a TTI bundling (e.g., via the one or more messages 1603) and/or a configured grant transmission (e.g., via the one or more messages 1603) (e.g., Type 1) for the wireless device 1601 at any time period. If a TB is scheduled to transmit, via a GF radio resource, the wireless device 1601 may ignore the TTI bundling (e.g., from the one or more messages 1603) and repeat a transmission of the TB with a single RV or different RVs according to a RV determination in one or more configured GF parameters (e.g., from the one or more messages 1607). Any RV pattern may be fixed, pre-configured, or configured (e.g., via the one or more messages 1603 and/or via the one or more messages 1607). An RV pattern may be configured by one or more RRC messages, for example, activating the configured grant transmission (e.g., Type 1). An RV pattern may indicate whether the wireless device 1601 repeats the transmission of the TB with a single RV or different RVs. During the repetition of the TB transmission associated with the GF radio resource, for an early termination, the wireless device 1601 may receive a HARQ ACK and/or NACK before completing K repetition. If a TB is scheduled to transmit, via a radio resource not associated with a GF radio resource, the wireless device 1601 may apply the TTI bundling to the transmission of the TB. The wireless device 1601 may repeat a transmission of the TB TTI_BUNDLE_SIZE times (e.g., if configured grant is not configured). Any RV pattern of the transmission of the TB TTI_BINDLE_SIZE times may be fixed, pre-configured, or configured (e.g., via the one or more messages 1603 and/or via the one or more messages 1607). With the TTI bundling, the wireless device 1601 may receive HARQ ACK and/or NACK with a time offset, for example, after completing one or more transmission of the bundle.

Figure 17:
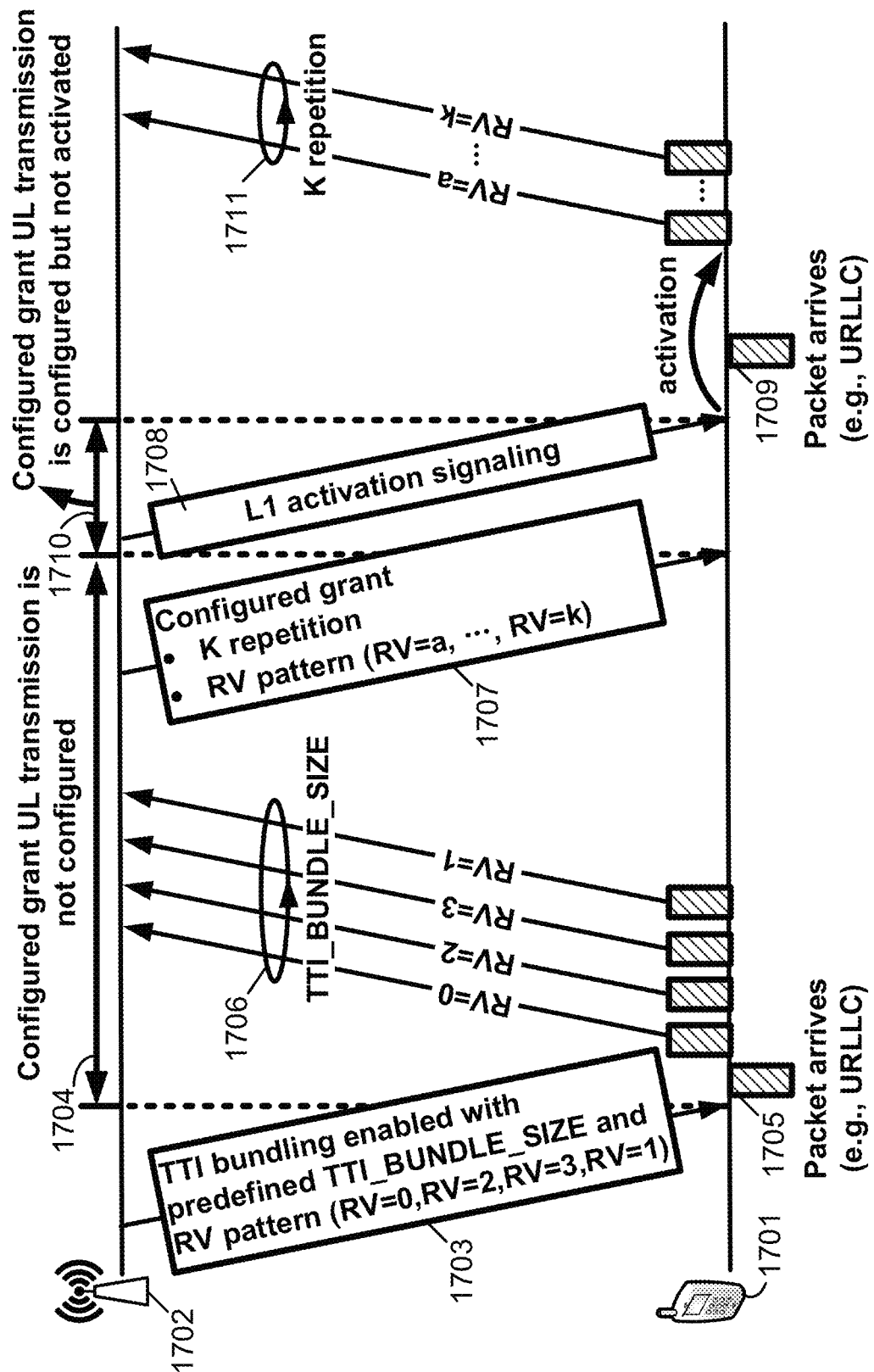
FIG. 17 shows an example for activating uplink transmission.

FIG. 17 shows an example for activating configured grant transmission. Elements 1701-1707 shown in FIG. 17 correspond to similarly numbered elements 1601-1607 shown in FIG. 16, descriptions of which are incorporated by reference here. The base station 1702 may transmit, to the wireless device 1701, one or more messages 1707 comprising a GF configuration (e.g., Type 2). The one or more messages 1707 may comprise one or more values for K repetitions and/or one or more RV patterns (e.g., RV=a, RV=b, . . . RV=k). The base station 1702 may transmit the one or more messages 1707 via RRC messaging. After the wireless device 1701 receives the GF configuration (e.g., Type 2), for example, during time period 1710, the wireless device 1701 may have configured grant transmission configured, but configured grant transmission may not be activated. The base station 1702 may transmit, to the wireless device 1701, L1 activation signaling 1708 to activate configured grant transmission. The base station 1702 may transmit the L1 activation signaling 1708 based on a type of grant, for example, if the grant is for semi-persistent scheduling (SPS) or configured grant Type 2. The wireless device 1701 may receive the L1 activation signaling 1708. After or in response to receiving the L1 activation signaling 1708, the wireless device 1701 may be activated for a transmission of one or more packets. One or more packets 1709 may arrive for a transmission (e.g., for a URLLC service), for example, after GF configuration is configured and activated. The wireless device 1701 may transmit, after time period 1710 when configured grant transmission may be configured and activated, K number of repetitions 1711 of the one or more packets 1709. Each of the K number of repetitions 1711 may be transmitted with a RV corresponding to a RV pattern in the one or more messages 1707. The one or more RV patterns in the one or more messages 1707 may be different from the one or more RV patterns in the one or more messages 1703. The value of K may be different from the value of TTI_BUNDLE_SIZE.

The base station 1702 may activate a TTI bundling (e.g., via the one or more messages 1703) and configure (e.g., via the one or more messages 1707) a configured grant transmission (e.g., Type 2) for the wireless device 1701. Until the wireless device 1701 receives the L1 activation signaling 1708, the wireless device 1701 may apply the TTI bundling (e.g., from the one or more messages 1703) to a TB transmission. After the wireless device 1701 receives an L1 activation signaling (e.g., via the L1 activation signaling 1708) activating the configured grant transmission, the wireless device 1701 may start to apply a K repetition (e.g., from the one or more messages 1707) configured by the configured grant transmission to a TB transmission. One or more parameters indicating the K repetition may be configured via one or more RRC messages, configuring the configured grant transmission, or may be configured via L1 activation signaling. If a TB is scheduled to transmit, via a GF radio resource activated by the L1 activation signaling, the wireless device 1701 may ignore the TTI bundling (e.g., from the one or more messages 1703) and repeat a transmission of the TB with a single RV or different RVs according to the RV determination in one or more configured GF parameters (e.g., from the one or more messages 1707). An RV pattern may be pre-configured, configured by one or more RRC messages configuring the configured grant transmission, or configured by the L1 activation signaling activating the configured grant transmission configured by one or more RRC messages. An RV pattern may indicate whether the wireless device 1701 repeats the transmission of the TB with a single RV or different RVs. During the repetition of the TB transmission associated with the GF radio resource, for an early termination, the wireless device 1701 may receive a HARQ ACK and/or NACK before completing K repetition. If a TB is scheduled to transmit, via a radio resource not associated with a GF radio resource, the wireless device 1701 may apply the TTI bundling to the transmission of the TB. The wireless device 1701 may repeat a transmission of the TB TTI_BUNDLE_SIZE times. With the TTI bundling, the wireless device 1701 may receive HARQ ACK and/or NACK with a time offset, for example, after completing one or more transmission of the bundle.

Figure 18:
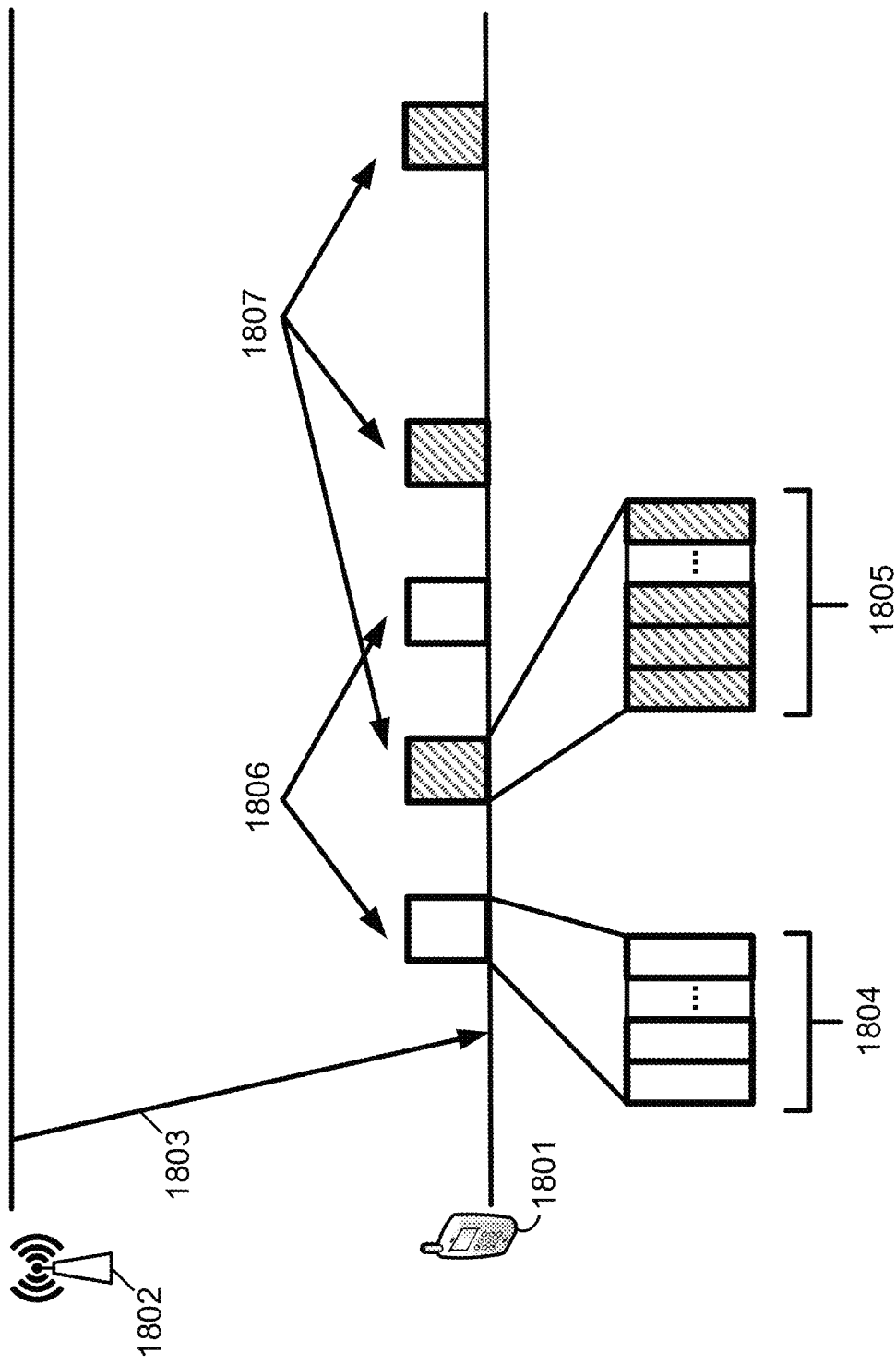
FIG. 18 shows an example of using different resources depending on whether resources are for dynamic grant or configured grant uplink transmissions.

FIG. 18 shows an example of using different resources depending on whether resources are for dynamic grant or configured grant. A base station 1802 may transmit, to a wireless device 1801, one or more messages 1803. The one or more messages may comprise configuration parameters. The configuration parameters may comprise parameters for one or more configured grants and parameters for one or more dynamic grant. The configuration parameters may comprise at least a first parameter value and a second parameter value. The first parameter value may be associated with a configured grant. The second parameter value may be associated with a dynamic grant. The wireless device 1801 may receive the one or more messages 1803. After or in response to receiving the one or more messages 1803, the wireless device 1801 may determine a first size of bundling 1805 for one or more resources for configured grants 1807. The first size of bundling 1805 may be based on the first parameter value. After or in response to receiving the one or more messages 1803, the wireless device 1801 may determine a second size of bundling 1804 for one or more resources for dynamic grants 1806. The second size of bundling 1805 may be based on the second parameter value. The first size of bundling 1805 and the second size of bundling 1804 may be a different size or the same size. The wireless device 1801 may transmit, to the base station 1802 and based on the first parameter value, one or more TBs using one or more resources for configured grants 1807. The wireless device 1801 may transmit, to the base station 1802 and based on the second parameter value, one or more TBs using one or more resources for dynamic grants 1806.

Figure 19:
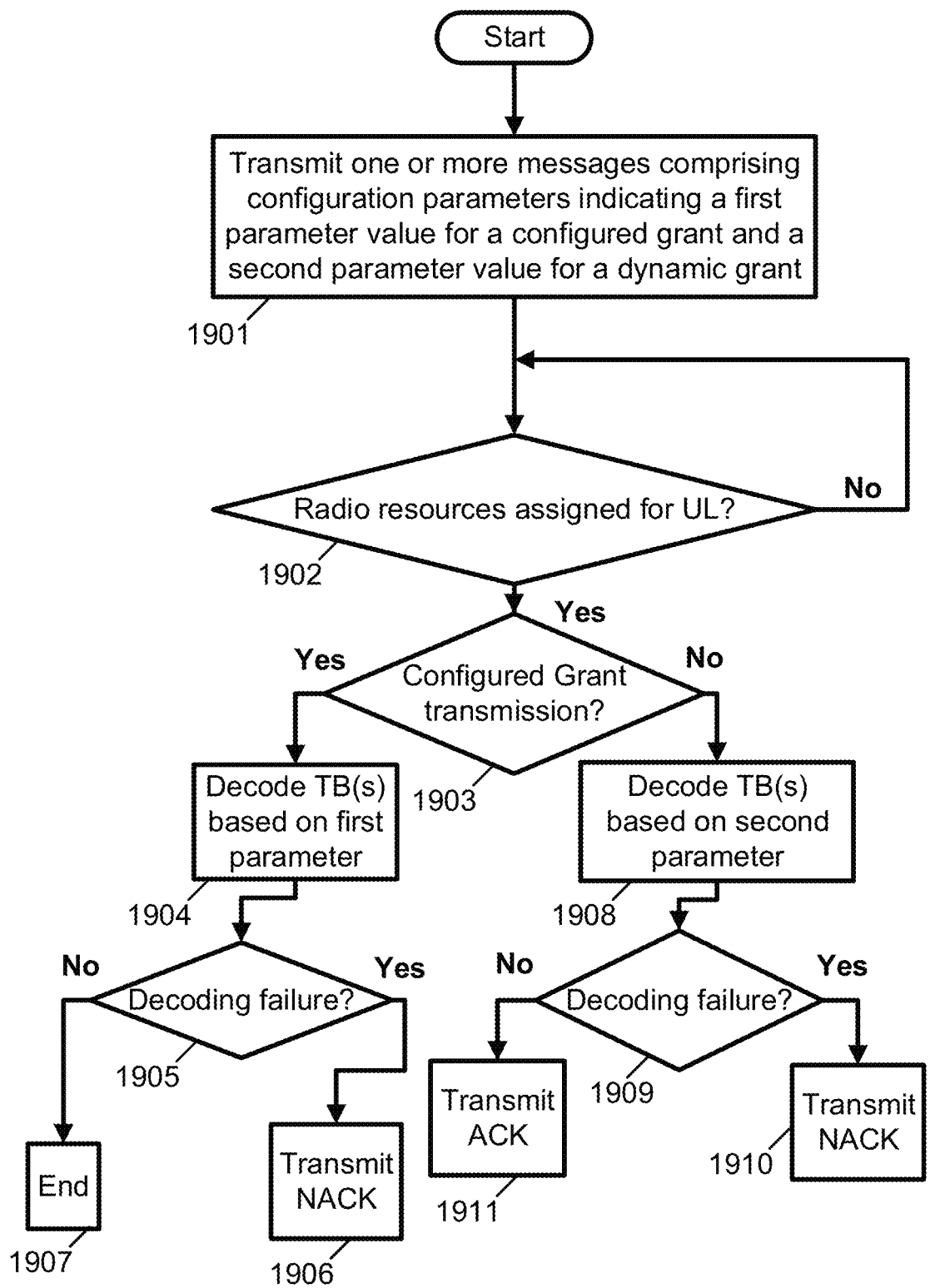
FIG. 19 shows an example for a base station regarding configured grant and dynamic grant uplink transmissions.

FIG. 19 shows an example of processes by a base station for using different resources for uplink transmissions. At step 1901, a base station may transmit, to a wireless device, one or more messages comprising configuration parameters. The one or more messages may be one or more RRC messages. The configuration parameters may comprise at least a first parameter value and a second parameter value. The first parameter value may be associated with a configured grant. The second parameter value may be associated with a dynamic grant. The configuration parameters may comprise one or more additional values that may be associated with a configured grant or a dynamic grant.

At step 1902, the base station may determine whether radio resources are assigned to the wireless device for uplink transmissions. If no radio resources are assigned to the wireless device for uplink transmissions, the base station may repeat step 1902 periodically, for example, at each slot, mini-slot, TTI, subframe, or other time period. If radio resources are assigned to the wireless device for uplink transmissions, the base station may proceed to step 1903.

At step 1903, the base station may determine whether radio resources are assigned to the wireless device for configured grant transmission, and/or the base station may determine whether radio resources are assigned to the wireless device for dynamic grant transmission. If the base station determines that radio resources are assigned to the wireless device for configured grant transmission, the base station may proceed to step 1904. If the base station determines that radio resources are not assigned to the wireless device for configured grant transmission (and/or if the base station determines that the radio resources are assigned to the wireless device for dynamic grant transmission), the base station may proceed to step 1908.

At step 1904, the base station may attempt to decode, based on the first parameter, one or more TBs. The base station may attempt to decode the one or more TBs for a configured grant. At step 1905, the base station determines whether a decoding failure results. If the base station determines that a decoding failure results, the base station may transmit, to the wireless device, a NACK message at step 1906. If the base station determines that a decoding failure does not result, or that a decoding success results, then the base station may end the process at step 1907.

At step 1908, the base station may attempt to decode, based on the second parameter, one or more TBs. The base station may attempt to decode the one or more TBs for a dynamic grant. At step 1909, the base station determines whether a decoding failure results. If the base station determines that a decoding failure results, the base station may transmit, to the wireless device, a NACK message at step 1910. If the base station determines that a decoding failure does not result, or that a decoding success results, then the base station may transmit, to the wireless device, an ACK message at step 1911. Thereafter, the base station may end the process, or repeat one or more of the above steps.

Figure 20:
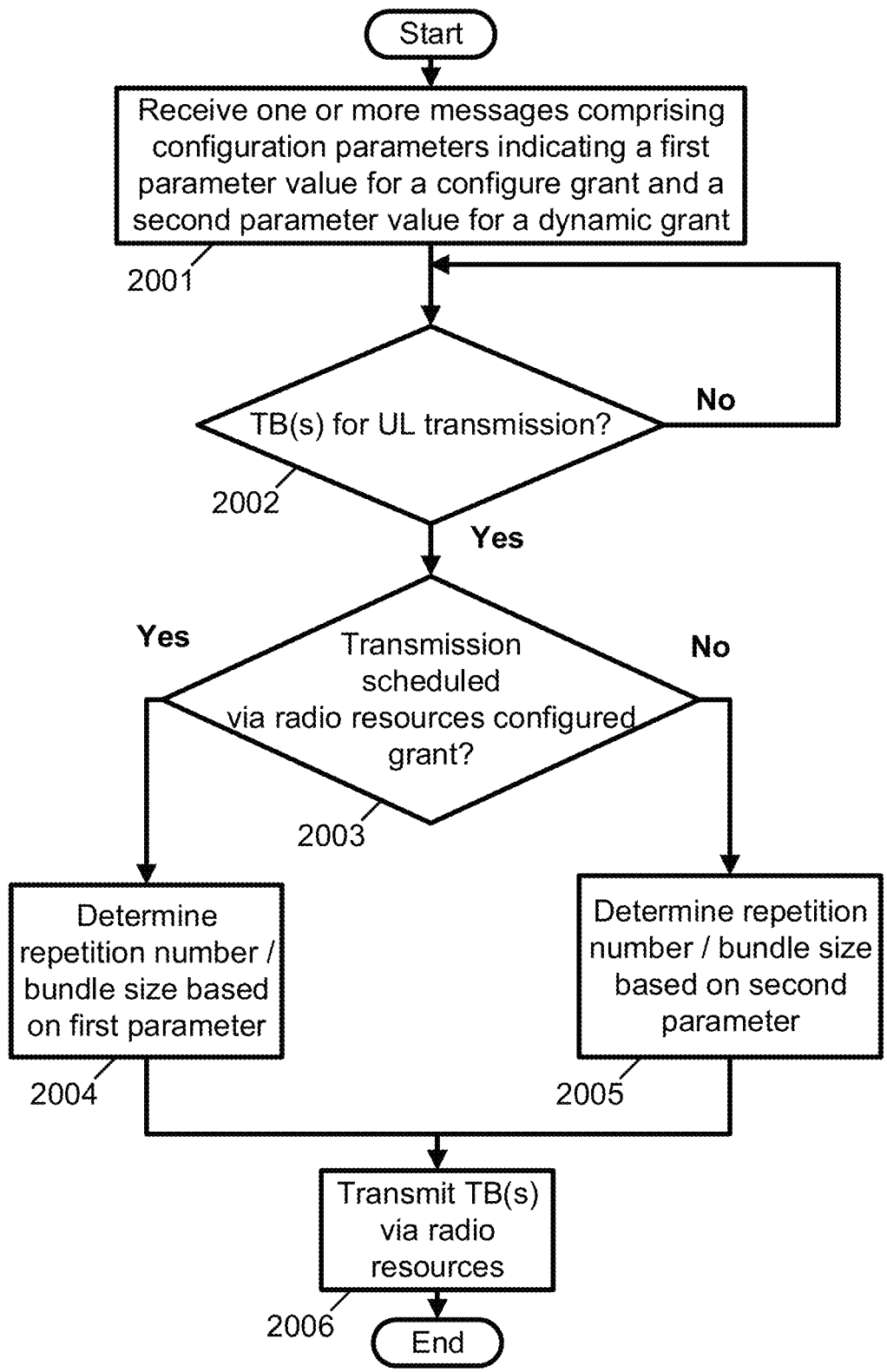
FIG. 20 shows an example for a wireless device regarding configured grant and dynamic grant uplink transmissions.

FIG. 20 shows an example of processes by a wireless device for uplink transmissions using different repetition values. At step 2001, the wireless device may receive, from a base station, one or more messages comprising configuration parameters. The one or more messages may be one or more RRC messages. The configuration parameters may comprise at least a first parameter value and a second parameter value. The first parameter value may be associated with a configured grant. The second parameter value may be associated with a dynamic grant. The configuration parameters may comprise one or more additional values that may be associated with a configured grant or a dynamic grant.

At step 2002, the wireless device may determine whether one or more TBs are generated for UL transmission. If no TBs are generated for UL transmission, the wireless device may repeat step 2002 periodically. If one or more TBs are generated for UL transmission, the wireless device may proceed to step 2003.

At step 2003, the wireless device may determine whether a transmission is scheduled via radio resources for configured grant transmission. If the wireless device determines that a transmission is scheduled via radio resources for configured grant transmission, the wireless device may proceed to step 2004. If the wireless device does not determine that a transmission is scheduled via radio resources for configured grant transmission, and/or if the wireless device determines that the transmission is scheduled via radio resources for dynamic grant, the wireless device may proceed to step 2005.

At step 2004, the wireless device may determine a number of repetitions of the transmission based on the first parameter. The number of repetitions may correspond to K repetitions, or another number of repetitions. At step 2005, the wireless device may determine a bundle size of the transmission based on the second parameter. The bundle size may correspond to TTI_BUNDLE_SIZE, or another number. After step 2004, the wireless device may transmit, to the base station via radio resources associated with a configured grant, the one or more TBs. After step 2005, the wireless device may transmit, to the base station via radio resources associated with a dynamic grant, the one or more TBs. After step 2005, the wireless device may end the process, or repeat one or more of the above steps.

A base station may transmit, and a wireless device may receive, one or more RRC messages. The one or more RRC messages may comprise one or more parameters of a cell for indicating: whether a TTI bundling with a pre-configured TTI bundle size is enabled or disabled; and/or grant-free radio resource parameters configured for a grant-free scheduling. The wireless device may transmit, via one or more resource blocks of the cell, a first TB. The wireless device may re-transmit, a first number of times (or 1 fewer than a first number of times), the first TB via the one or more resource blocks. If the one or more resource blocks correspond to the grant free radio resource parameters, the first number may have a first value independent from the pre-configured TTI bundle size. If the one or more resource blocks do not correspond to the grant free radio resource parameters, the number may have a second value dependent on the pre-configured TTI bundle size. The one or more RRC messages may comprise a first parameter indicating the first value. The wireless device may activate the grant free scheduling after or in response to receiving the one or more RRC messages. The wireless device may receive DCI comprising at least one first field indicating the one or more resource block of the cell. The DCI may comprise at least one second field activating the grant-free scheduling. The wireless device may receive DCI comprising a second parameter indicating the first value.

A base station (e.g. a gNB) and/or a wireless device may perform any combination of a step and/or a complementary step of one or more of the steps described herein. Any step performed by a gNB may be performed by any base station. A core network device, or any other device, may perform any combination of a step, or a complementary step, of one or more of the above steps. Some or all of these steps may be performed, and the order of these steps may be adjusted. Additional steps may also be performed. Any base station described herein may be a current base station, a serving base station, a source base station, a target base station, or any other base station.

Figure 21:
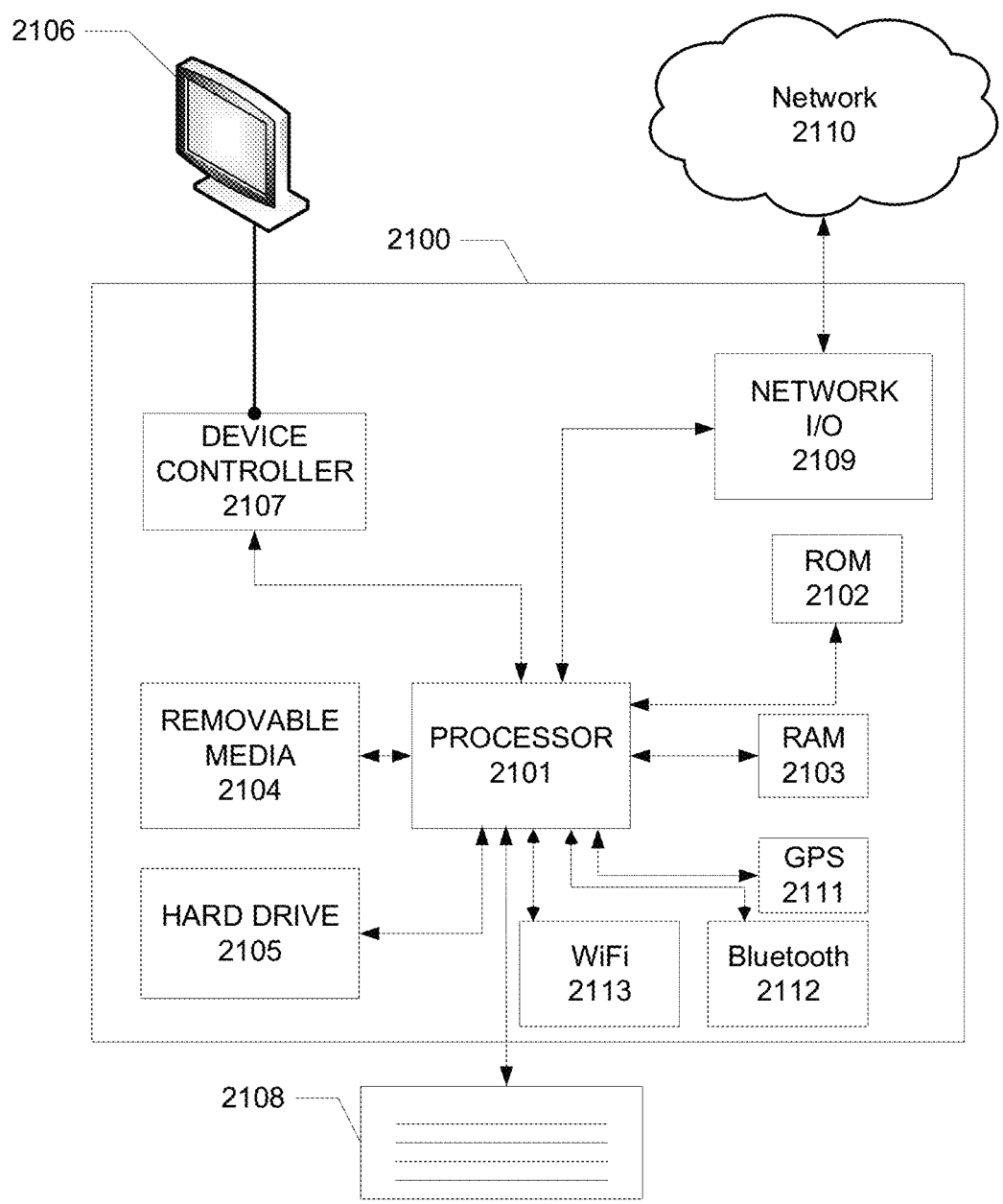
FIG. 21 shows example elements of a computing device that may be used to implement any of the various devices described herein.

FIG. 21 shows general hardware elements that may be used to implement any of the various computing devices discussed herein, including, for example, the base station 401, the wireless device 406, or any other base station, wireless device, or computing device described herein. The computing device 2100 may include one or more processors 2101, which may execute instructions stored in the random access memory (RAM) 2103, the removable media 2104 (such as a Universal Serial Bus (USB) drive, compact disk (CD) or digital versatile disk (DVD), or floppy disk drive), or any other desired storage medium. Instructions may also be stored in an attached (or internal) hard drive 2105. The computing device 2100 may also include a security processor (not shown), which may execute instructions of one or more computer programs to monitor the processes executing on the processor 2101 and any process that requests access to any hardware and/or software components of the computing device 2100 (e.g., ROM 2102, RAM 2103, the removable media 2104, the hard drive 2105, the device controller 2107, a network interface 2109, a GPS 2111, a Bluetooth interface 2112, a WiFi interface 2113, etc.). The computing device 2100 may include one or more output devices, such as the display 2106 (e.g., a screen, a display device, a monitor, a television, etc.), and may include one or more output device controllers 2107, such as a video processor. There may also be one or more user input devices 2108, such as a remote control, keyboard, mouse, touch screen, microphone, etc. The computing device 2100 may also include one or more network interfaces, such as a network interface 2109, which may be a wired interface, a wireless interface, or a combination of the two. The network interface 2109 may provide an interface for the computing device 2100 to communicate with a network 2110 (e.g., a RAN, or any other network). The network interface 2109 may include a modem (e.g., a cable modem), and the external network 2110 may include communication links, an external network, an in-home network, a provider's wireless, coaxial, fiber, or hybrid fiber/coaxial distribution system (e.g., a DOCSIS network), or any other desired network. Additionally, the computing device 2100 may include a location-detecting device, such as a global positioning system (GPS) microprocessor 2111, which may be configured to receive and process global positioning signals and determine, with possible assistance from an external server and antenna, a geographic position of the computing device 2100.

The example in FIG. 21 is a hardware configuration, although the components shown may be implemented as software as well. Modifications may be made to add, remove, combine, divide, etc. components of the computing device 2100 as desired. Additionally, the components may be implemented using basic computing devices and components, and the same components (e.g., processor 2101, ROM storage 2102, display 2106, etc.) may be used to implement any of the other computing devices and components described herein. For example, the various components described herein may be implemented using computing devices having components such as a processor executing computer-executable instructions stored on a computer-readable medium, as shown in FIG. 21. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
  receiving, by a wireless device and from a base station, a radio resource control message indicating:
    a first number of transmissions for a transport block within a bundle of a configured grant; and
    a second number of transmissions for a transport block within a bundle of a dynamic grant; and
  transmitting, within the bundle of the configured grant, a transport block the first number of times.

2. The method of claim 1, further comprising activating, after receiving the radio resource control message, the configured grant, wherein the configured grant is for one or more uplink transmissions of a configured grant Type 1.

3. The method of claim 1, further comprising activating, after receiving a control message transmitted via a physical downlink control channel, the configured grant, wherein the configured grant is for one or more uplink transmissions of a configured grant Type 2.

4. The method of claim 1, further comprising terminating the transmitting based on one or more of:
  receiving an uplink grant scheduling the transmitted transport block; or
  a quantity of total transmissions of the transmitted transport block being equal to the first number.

5. The method of claim 1, further comprising transmitting one or more hybrid automatic repeat request (HARQ) transmissions within the bundle of the configured grant.

6. The method of claim 1, further comprising:
  receiving an indication of the dynamic grant; and
  transmitting, within the bundle of the dynamic grant, a second transport block the second number of times.

7. The method of claim 6, further comprising terminating transmission of the second transport block, based on a quantity of total transmissions of the second transport block being equal to the second number.

8. The method of claim 6, wherein the indication of the dynamic grant further comprises a redundancy version (RV) pattern.

9. The method of claim 1, wherein the radio resource control message further comprises a redundancy version (RV) pattern for the first number of transmissions.

10. The method of claim 9, wherein the transmitting comprises transmitting, based on the RV pattern, the transport block the first number of times.

11. The method of claim 1, wherein the bundle of the configured grant comprises a transmission time interval (TTI) bundle.

12. A method comprising:
  transmitting, by a base station, a radio resource control message indicating:
    a first number of transmissions for a transport block within a bundle of a configured grant; and
    a second number of transmissions for a transport block within a bundle of a dynamic grant; and
  receiving, from a wireless device and within the bundle of the configured grant, a transport block the first number of times.

13. The method of claim 12, further comprising activating, after transmitting the radio resource control message, the configured grant, wherein the configured grant is for one or more uplink transmissions of a configured grant Type 1.

14. The method of claim 12, further comprising activating, after transmitting a control message via a physical downlink control channel, the configured grant, wherein the configured grant is for one or more uplink transmissions of a configured grant Type 2.

15. The method of claim 12, further comprising receiving one or more hybrid automatic repeat request (HARQ) transmissions within the bundle of the configured grant.

16. The method of claim 12, further comprising:
transmitting an indication of the dynamic grant; and
receiving, from the wireless device and within the bundle of the dynamic grant, a second transport block the second number of times.

17. The method of claim 16, wherein the indication of the dynamic grant further comprises a redundancy version (RV) pattern.

18. The method of claim 12, wherein the radio resource control message further comprises a redundancy version (RV) pattern for the first number of transmissions.

19. The method of claim 18, wherein the receiving comprises receiving, based on the RV pattern, the transport block the first number of times.

20. The method of claim 12, wherein the bundle of the configured grant comprises a transmission time interval (TTI) bundle.

21. A wireless device comprising:
one or more processors; and
memory storing instructions that, when executed by the one or more processors, cause the wireless device to:
receive, from a base station, one or more radio resource control messages indicating:
a first number of transmissions for a transport block within a bundle of a configured grant; and
a second number of transmissions for a transport block within a bundle of a dynamic grant; and
transmit, within the bundle of the configured grant, a transport block the first number of times.

22. The wireless device of claim 21, wherein the instructions, when executed by the one or more processors, cause the wireless device to activate, after receiving the radio resource control message, the configured grant, wherein the configured grant is for one or more uplink transmissions of a configured grant Type 1.

23. The wireless device of claim 21, wherein the instructions, when executed by the one or more processors, cause the wireless device to activate, after receiving a control message transmitted via a physical downlink control channel, the configured grant, wherein the configured grant is for one or more uplink transmissions of a configured grant Type 2.

24. The wireless device of claim 21, wherein the instructions, when executed by the one or more processors, cause the wireless device to terminate transmission based on one or more of:
receiving an uplink grant scheduling the transmitted transport block; or
a quantity of total transmissions of the transmitted transport block being equal to the first number.

25. The wireless device of claim 21, wherein the instructions, when executed by the one or more processors, cause the wireless device to transmit one or more hybrid automatic repeat request (HARQ) transmissions within the bundle of the configured grant.

26. The wireless device of claim 21, wherein the instructions, when executed by the one or more processors, cause the wireless device to:
receive an indication of the dynamic grant; and
transmit, within the bundle of the dynamic grant, a second transport block the second number of times.

27. The wireless device of claim 26, wherein the instructions, when executed by the one or more processors, cause the wireless device to terminate transmission of the second transport block, based on a quantity of total transmissions of the second transport block being equal to the second number.

28. The wireless device of claim 26, wherein the indication of the dynamic grant further comprises a redundancy version (RV) pattern.

29. The wireless device of claim 21, wherein the radio resource control message further comprises a redundancy version (RV) pattern for the first number of transmissions.

30. The wireless device of claim 29, wherein the instructions, when executed by the one or more processors, cause the wireless device to transmit the transport block by transmitting, based on the RV pattern, the transport block the first number of times.

31. The wireless device of claim 21, wherein the bundle of the configured grant comprises a transmission time interval (TTI) bundle.

32. A base station comprising:
one or more processors; and
memory storing instructions that, when executed by the one or more processors, cause the base station to:
transmit a radio resource control message indicating:
a first number of transmissions for a transport block within a bundle of a configured grant; and
a second number of transmissions for a transport block within a bundle of a dynamic grant; and
receive, from a wireless device and within the bundle of the configured grant, a transport block the first number of times.

33. The base station of claim 32, wherein the instructions, when executed by the one or more processors, cause the base station to activate, after transmitting the radio resource control message, the configured grant, wherein the configured grant is for one or more uplink transmissions of a configured grant Type 1.

34. The base station of claim 32, wherein the instructions, when executed by the one or more processors, cause the base station to activate, after transmitting a control message via a physical downlink control channel, the configured grant, wherein the configured grant is for one or more uplink transmissions of a configured grant Type 2.

35. The base station of claim 32, wherein the instructions, when executed by the one or more processors, cause the base station to receive one or more hybrid automatic repeat request (HARQ) transmissions within the bundle of the configured grant.

36. The base station of claim 32, wherein the instructions, when executed by the one or more processors, cause the base station to:
transmit an indication of the dynamic grant; and
receive, from the wireless device and within the bundle of the dynamic grant, a second transport block the second number of times.

37. The base station of claim 36, wherein the indication of the dynamic grant further comprises a redundancy version (RV) pattern.

38. The base station of claim 32, wherein the radio resource control message further comprises a redundancy version (RV) pattern for the first number of transmissions.

39. The base station of claim 38, wherein the instructions, when executed by the one or more processors, cause the base station to receive the transport block by receiving, based on the RV pattern, the transport block the first number of times.

40. The base station of claim 32, wherein the bundle of the configured grant comprises a transmission time interval (TTI) bundle.

41. A non-transitory computer-readable medium comprising instructions that, when executed, configure a wireless device to:
   receive, from a base station, one or more radio resource control messages indicating:
      a first number of transmissions for a transport block within a bundle of a configured grant; and
      a second number of transmissions for a transport block within a bundle of a dynamic grant; and
   transmit, within the bundle of the configured grant, a transport block the first number of times.

42. The non-transitory computer-readable medium of claim 41, wherein the instructions, when executed, configure the wireless device to terminate transmission based on one or more of:
   receiving an uplink grant scheduling the transmitted transport block; or
   a quantity of total transmissions of the transmitted transport block being equal to the first number.

43. The non-transitory computer-readable medium of claim 41, wherein the instructions, when executed, configure the wireless device to transmit one or more hybrid automatic repeat request (HARQ) transmissions within the bundle of the configured grant.

44. The non-transitory computer-readable medium of claim 41, wherein the instructions, when executed, configure the wireless device to:
   receive an indication of the dynamic grant; and
   transmit, within the bundle of the dynamic grant, a second transport block the second number of times.

45. The non-transitory computer-readable medium of claim 41, wherein the instructions, when executed, configure the wireless device to transmit, based on a redundancy version (RV) pattern for the first number of transmissions, the transport block the first number of times.

46. A non-transitory computer-readable medium comprising instructions that, when executed, configure a base station to:
   transmit a radio resource control message indicating:
      a first number of transmissions for a transport block within a bundle of a configured grant; and
      a second number of transmissions for a transport block within a bundle of a dynamic grant; and
   receive, from a wireless device and within the bundle of the configured grant, a transport block the first number of times.

47. The non-transitory computer-readable medium of claim 46, wherein the instructions, when executed, configure the base station to activate the configured grant.

48. The non-transitory computer-readable medium of claim 46, wherein the instructions, when executed, configure the base station to receive one or more hybrid automatic repeat request (HARQ) transmissions within the bundle of the configured grant.

49. The non-transitory computer-readable medium of claim 46, wherein the instructions, when executed, configure the base station to:
   transmit an indication of the dynamic grant; and
   receive, from the wireless device and within the bundle of the dynamic grant, a second transport block the second number of times.

50. The base station of claim 46, wherein the instructions, when executed, configure the base station to receive, based on a redundancy version (RV) pattern for the first number of transmissions, the transport block the first number of times.

51. A system comprising:
   a base station; and
   a wireless device,
      wherein the base station is configured to transmit a radio resource control message indicating:
         a first number of transmissions for a transport block within a bundle of a configured grant; and
         a second number of transmissions for a transport block within a bundle of a dynamic grant; and
      wherein the wireless device is configured to transmit, within the bundle of the configured grant, a transport block the first number of times.

52. The system of claim 51, wherein the wireless device is configured to terminate transmission based on one or more of:
   receiving an uplink grant scheduling the transmitted transport block; or
   a quantity of total transmissions of the transmitted transport block being equal to the first number.

53. The system of claim 51, wherein the wireless device is configured to transmit one or more hybrid automatic repeat request (HARQ) transmissions within the bundle of the configured grant.

54. The system of claim 51, wherein:
   the base station is configured to transmit an indication of the dynamic grant; and
   the wireless device is configured to transmit, within the bundle of the dynamic grant, a second transport block the second number of times.

55. The system of claim 51, wherein the wireless device is configured to transmit, based on a redundancy version (RV) pattern for the first number of transmissions, the transport block the first number of times.

* * * * *